July 17, 1962  D. ROSE  3,044,626
WATER SOFTENING APPARATUS AND SYSTEM
Filed Jan. 6, 1958  14 Sheets-Sheet 3
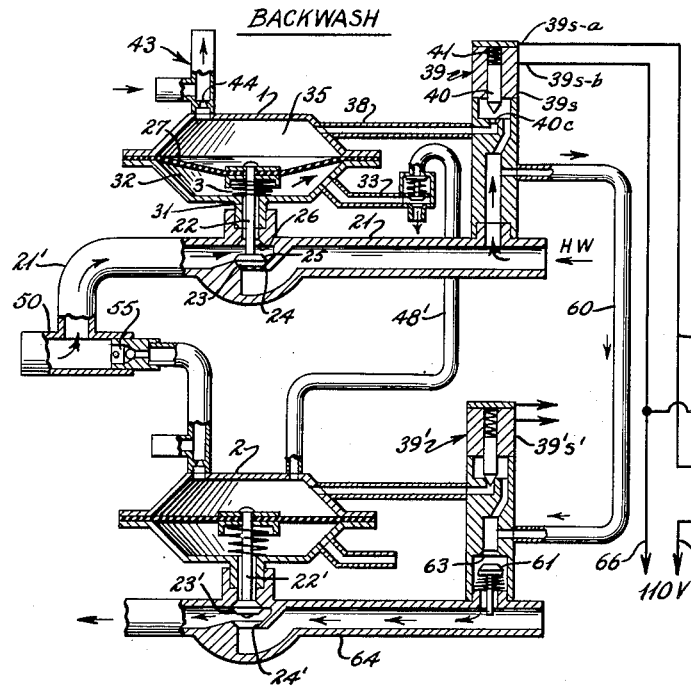
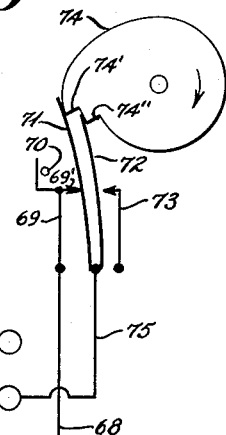
Fig. 3
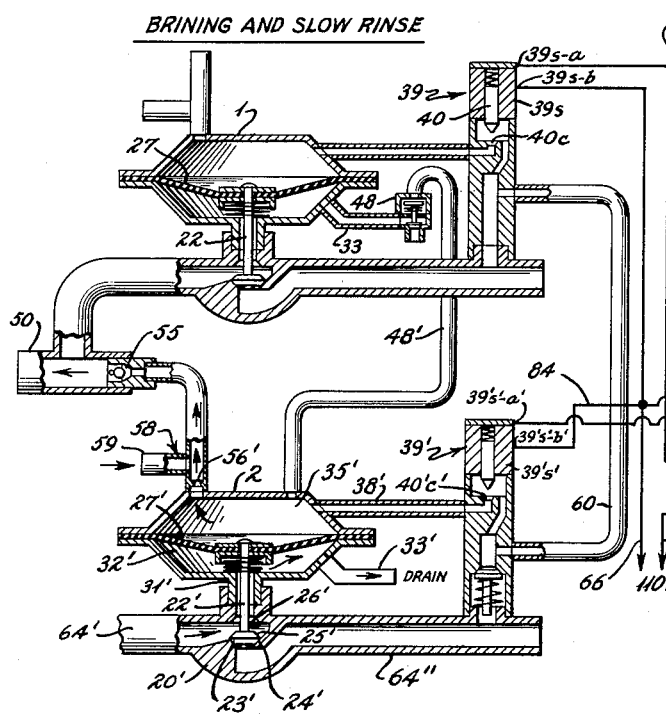
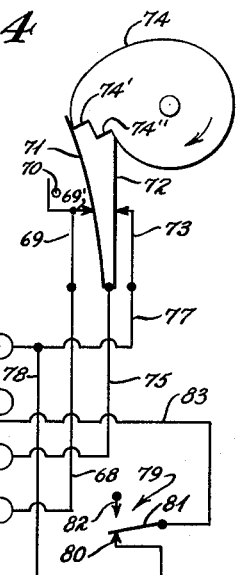
Fig. 4
INVENTOR
Donald Rose
BY Beale and Jones
ATTORNEYS

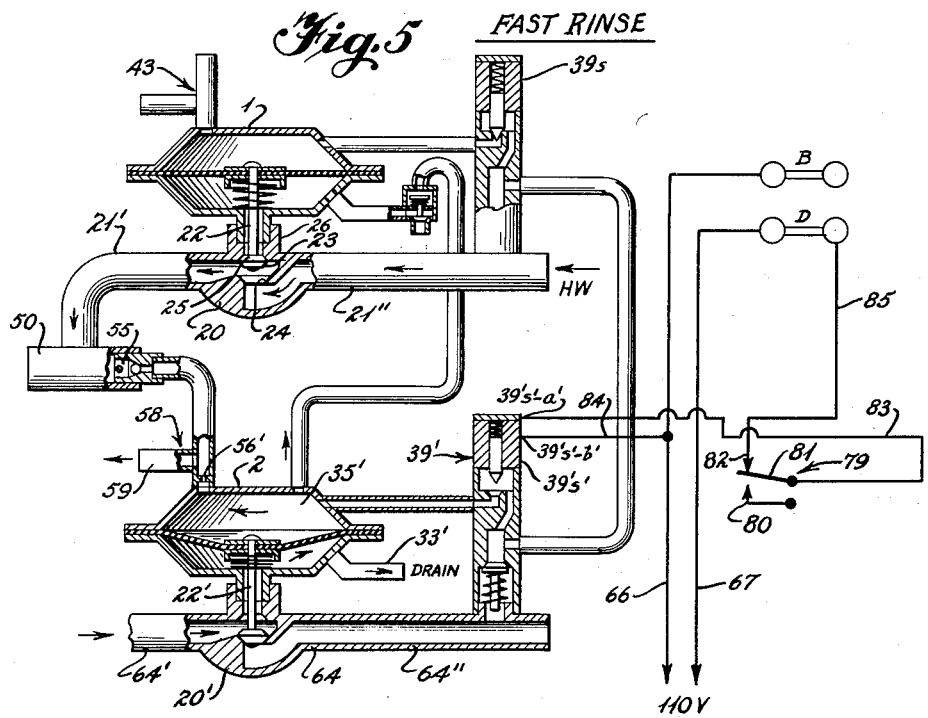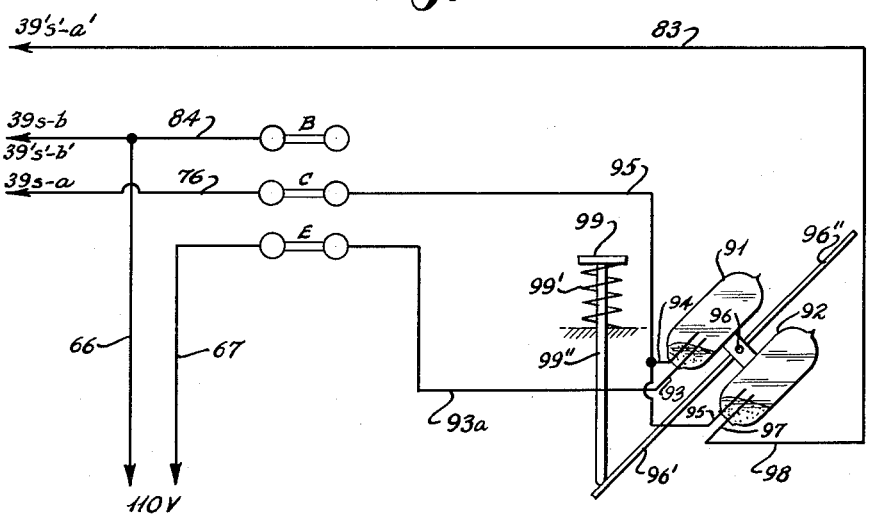

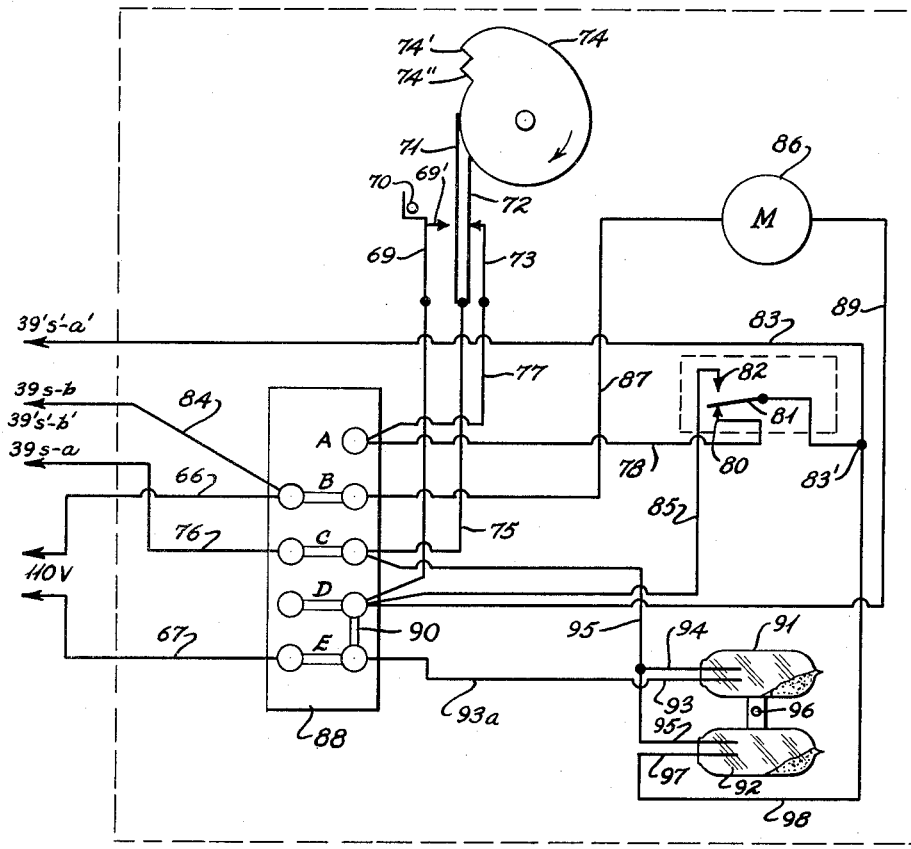
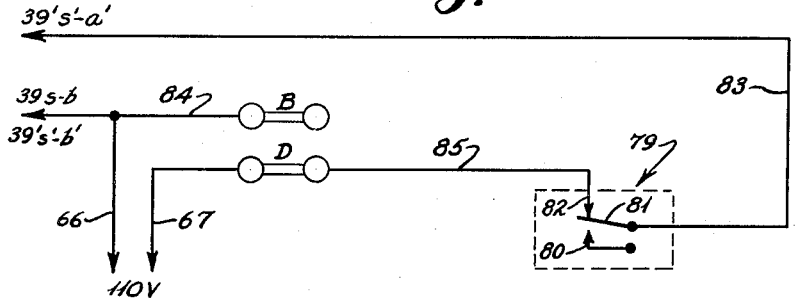

July 17, 1962  D. ROSE  3,044,626
WATER SOFTENING APPARATUS AND SYSTEM
Filed Jan. 6, 1958  14 Sheets-Sheet 6
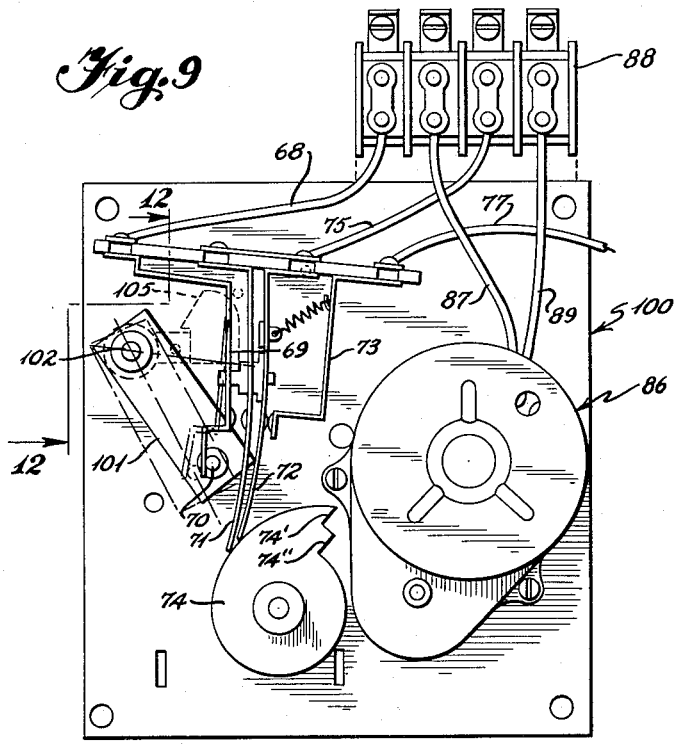
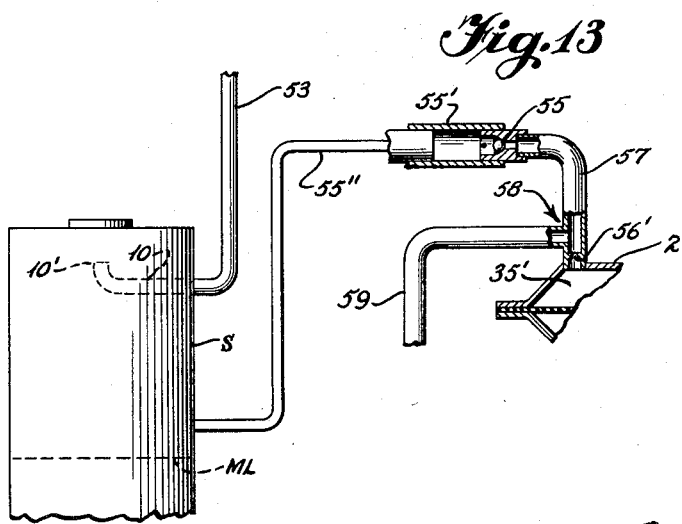
INVENTOR
Donald Rose
BY Beale and Jones
ATTORNEYS July 17, 1962  D. ROSE  3,044,626
WATER SOFTENING APPARATUS AND SYSTEM
Filed Jan. 6, 1958  14 Sheets-Sheet 7

INVENTOR
Donald Rose

BY Beale and Jones
ATTORNEYS

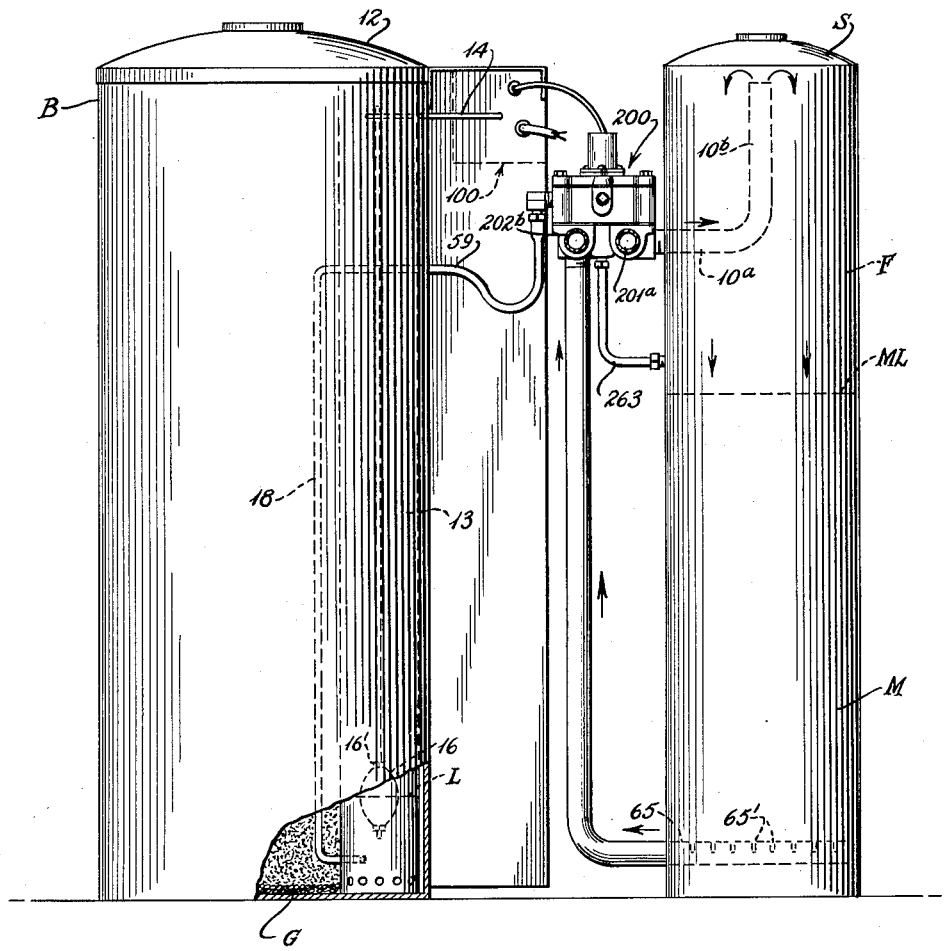

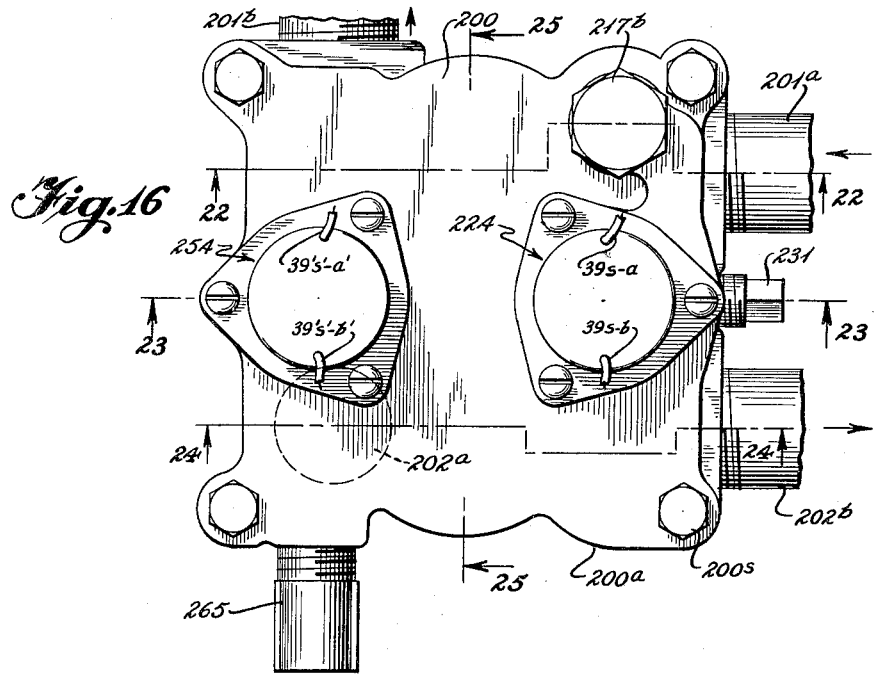
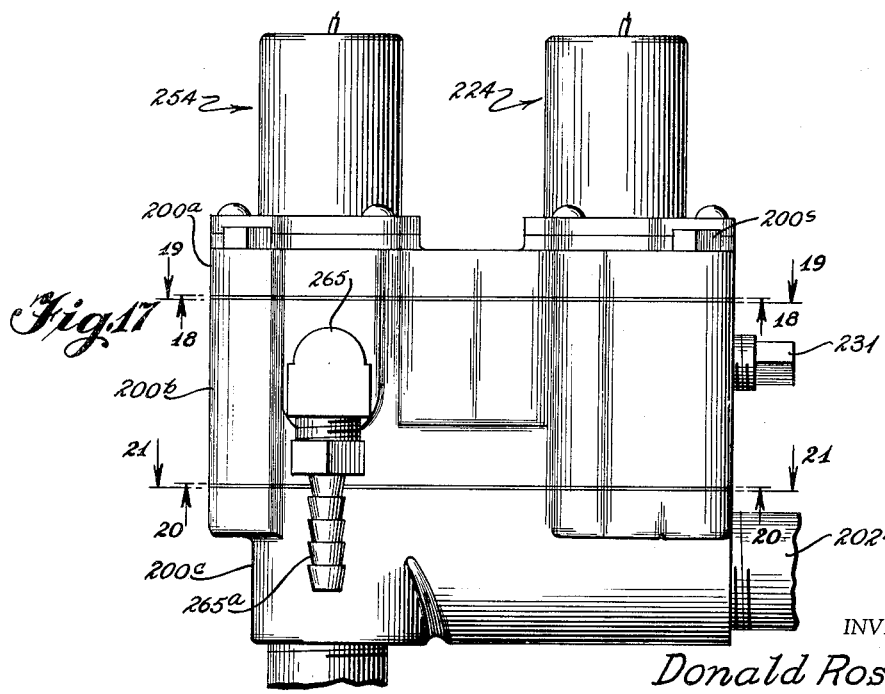

INVENTOR
Donald Rose
BY Beale and Jones
ATTORNEYS

July 17, 1962        D. ROSE        3,044,626
WATER SOFTENING APPARATUS AND SYSTEM
Filed Jan. 6, 1958        14 Sheets-Sheet 11
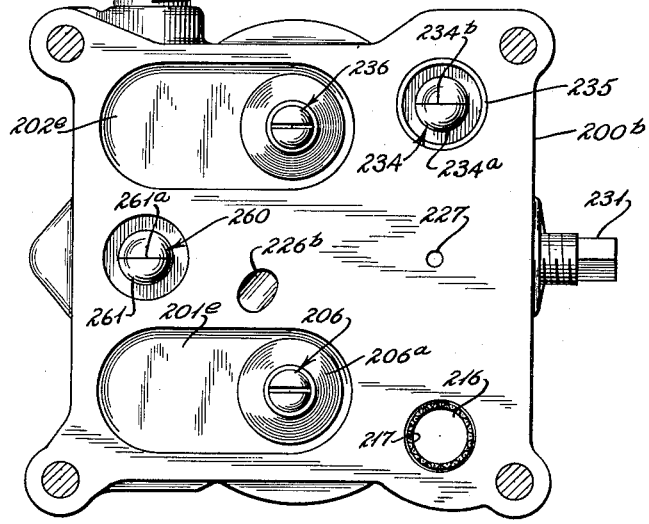
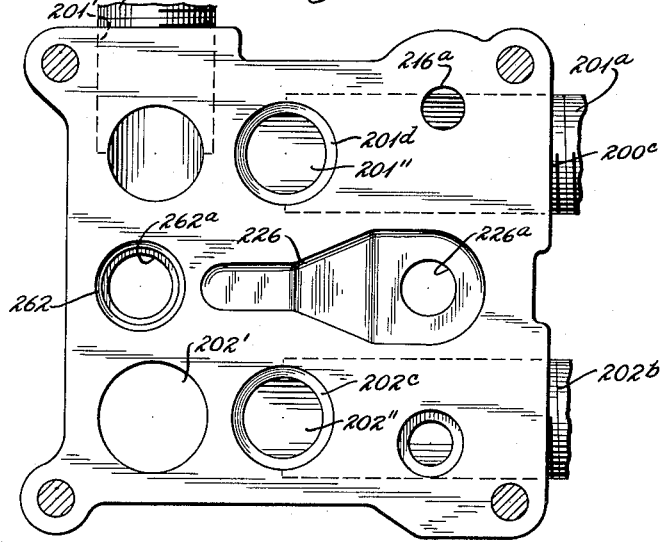
INVENTOR
*Donald Rose*
BY *Beale and Jones*
ATTORNEYS July 17, 1962 D. ROSE 3,044,626
WATER SOFTENING APPARATUS AND SYSTEM
Filed Jan. 6, 1958 14 Sheets-Sheet 12

INVENTOR
Donald Rose
BY Beale and Jones
ATTORNEYS

July 17, 1962 D. ROSE 3,044,626
WATER SOFTENING APPARATUS AND SYSTEM
Filed Jan. 6, 1958 14 Sheets—Sheet 13
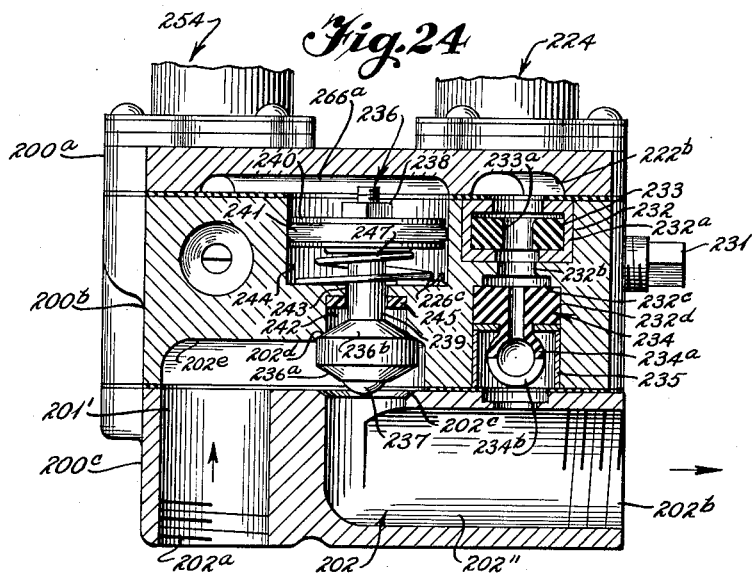
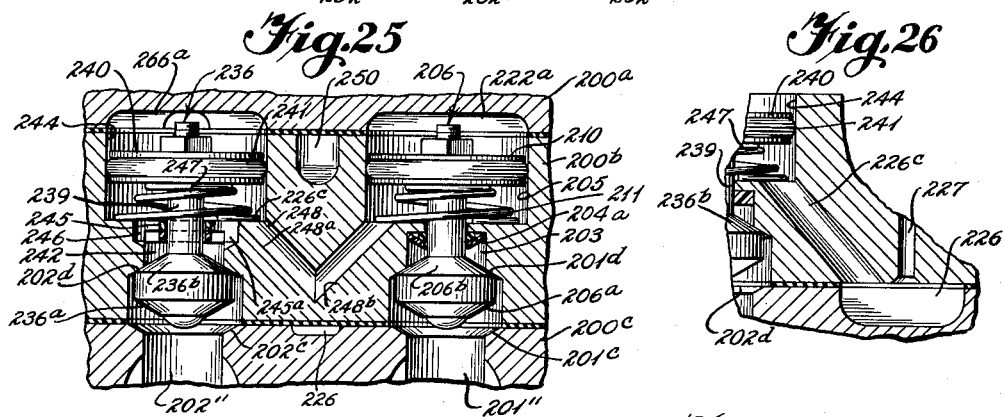
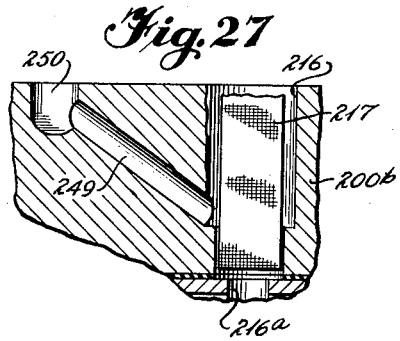
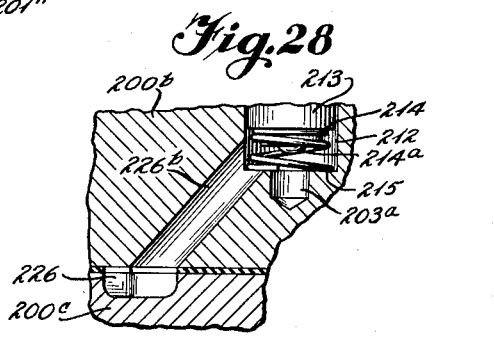
INVENTOR
Donald Rose
BY Beale and Jones
ATTORNEYS INVENTOR
Donald Rose
BY Beale and Jones
ATTORNEYS

United States Patent Office 3,044,626
Patented July 17, 1962

3,044,626
WATER SOFTENING APPARATUS AND SYSTEM
Donald Rose, Dayton, Ohio, assignor of one-half to
Ronald D. Baker, Dayton, Ohio
Filed Jan. 6, 1958, Ser. No. 707,267
12 Claims. (Cl. 210—103)

This invention is directed to apparatus and control mechanism for treating liquids and in more particular to water softening apparatus.

This application is a continuation-in-part of my applications Serial No. 651,721 filed April 9, 1957 and Serial No. 695,376 filed November 8, 1957 and now abandoned.

A primary object of this invention is to provide means for treating hard water by use of a mineral softener wherein optimum conditions of use of the mineral substance is maintained automatically.

Another object of the invention is to provide an automatically operated water treating apparatus that is economical to install and to maintain and yet provides reliable operation.

A further object of the invention is to provide a reliable and economical installation for treating water that utilizes downflow softening, controlled upflow backwash, controlled downflow brining and rinsing and controlled downflow final rinse in a manner to make greatest utilization of a mineral material used for treating water.

A still further object of the invention is to provide a water treating apparatus that can cope with iron and turbid waters as well as hard water.

Another object of this invention is to provide a water treating system that has a minimum of moving parts to accomplish a full automatic operation that utilizes the mineral to maximum advantage.

Yet a further object of the invention is to provide an automatic water softening apparatus that provides for dry storage of salt and makes maximum use of the salt supply that is used for regeneration of the mineral material.

A still further object of the invention is to provide an economical automatic water softener that uses a minimum amount of water, yet accomplishes a maximum utilization of the mineral material used for treating the water.

Another object of the invention is to provide in a water softener a control means that permits easy manual initiation of a regeneration with subsequent automatic operation of the apparatus.

Yet a further object of the invention is to provide in an automatic water treatment apparatus brine tank overflow automatic control.

Still further objects and the entire scope of applicability of the present invention will become apparent from the detailed description given hereinafter. It should be understood, however, that the detailed description and specific examples which are given by way of illustration only and, while indicating preferred embodiments of the invention, are not given by way of limitation, since various changes and modifications within the spirit and scope of the invention will become apparent to those skilled in the art from this detailed description.

Other objects and advantages will appear from the following description and the accompanying drawings in which:

FIG. 3 is a view of the valve mechanism of FIG. 2 including circuit control mechanism showing the backwash position of the valves;

FIG. 4 is a view of the valve mechanism of FIG. 2 including circuit control mechanism showing the position of the valves for brining and slow rinse;

FIG. 5 is a view of the valve mechanism of FIG. 2 including circuit control mechanism showing the position of the valves for fast rinse with a holding circuit for one of the solenoids;

FIG. 6 is a view of the combined control circuits;

FIG. 7 shows the portion of the control circuit for manual actuation to initiate a brining and slow rinse;

FIG. 8 shows the portion of the circuit for fast rinse following brining and slow rinse;

FIG. 9 is a view of the timer control mechanism showing certain cam actuation and timer actuation of the circuits;

FIG. 13 is a modification showing the brining line attached to the softener tank just above the mineral bed;

FIG. 15 shows a modification of the water softener apparatus using a modified valve arrangement;

FIG. 16 is a top plan view on an enlarged scale of the valve assembly shown in FIG. 15;

FIG. 17 is a front elevational view of the valve assembly shown in FIG. 16;

FIG. 20 is a sectional view along line 20—20 of FIG. 17 looking at the bottom of middle section of the valve assembly;

FIG. 21 is a sectional view along line 21—21 of FIG. 17 looking into the top of the bottom section of the valve assembly;

FIG. 24 is a cross-sectional view along line 24—24 of FIG. 16 showing the service line and certain valves therein;

FIG. 25 is a fragmentary cross-sectional view along line 25—25 of FIG. 16 showing the two valve elements and the actuators therefor in certain passageways;

FIG. 26 is a cross-sectional view along line 26—26 of FIG. 19 on an enlarged scale showing a drain passageway to the second valve element;

FIG. 27 is an enlarged sectional view along line 27—27 of FIG. 19 showing a strainer in the supply line and certain takeoff passages leading therefrom;

FIG. 28 is an enlarged sectional view along line 28—28 of FIG. 19 showing the drain cutoff valve adjacent the first valve element.

For a more complete understanding of the nature and scope of my invention, reference may be had to the description hereinafter given in which like reference characters refer to similar parts.

Figure 1:
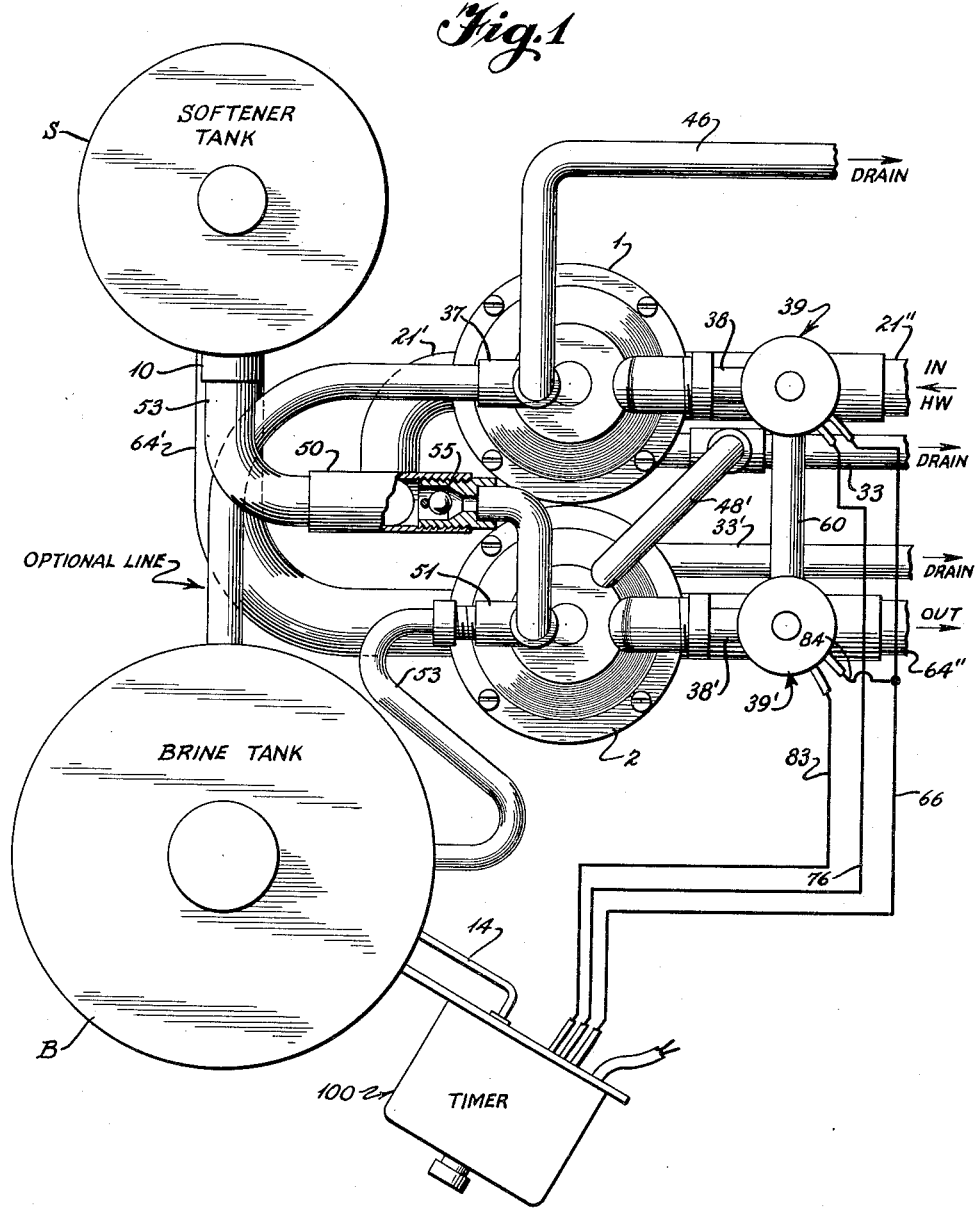
FIG. 1 is a plan view of the system.

The system includes the usual softener tank S containing the necessary minerals M for treating the hard water and a brine tank B that is loaded with salt which will have dry storage above the water level L and is sufficient, for example, for a normal house for one year upon one loading of the tank.

Tank S, the softener tank, has the hard water top distributor 10 of plastic material having an upwardly curved end 10′ within the tank adjacent the top thereof. This distributor on backwash cycle is connected to the drain and it has a curved neck which is always open to eliminate restrictions. Since the backwash is controlled, as will be explained hereinafter, there can be no loss of mineral M at any pressure, however, there is nothing to prevent iron or turbidity from being washed out of the softener tank S during the backwash cycle. The softener tank S has a freeboard F above the mineral bed of about 50 percent of the height of the tank. In operation, supply of brine during regeneration is provided preferably from a point about 1 inch above the mineral bed level ML which is shown as a modified connection in the drawings, see FIG. 13. By using this introduction of brine, the brine concentration is, therefore, not diluted by freeboard water F above the mineral bed M which has been isolated in the upper portion of tank S. The brine strength is always in the range of 8-12 percent by weight (30°–50° salometer). The mineral M in the tank is of a high capacity resin to provide for ion exchange in water softening. The brine tank B is preferably of plastic material to reduce corrosion and it has an easily removable cover 12 exposing the whole open end of the tank when the cover is removed for filling. In the brine tank B is positioned a cylindrical tube 13 of non-corrosive and durable plastic material. This plastic tube 13a has a plurality of spaced apart apertures 13 in the base thereof adjacent the bottom of the tank B to permit flow therethrough of water or brine. At the top portion of tube 13 is a vertically extending slot 13′ within which extends for pivotal movement up and down an arm 14 that operates a microswitch in the controls and in an extreme up position it operates a set of safety switches to permit recycling and thus relieve any overflow of tank B, as will be described. Pivotally connected to arm 14 is a float rod 15 having a float 16 adjustably secured adjacent the bottom thereof and operating freely within cylinder 13 without any interference from the salt supply. Secured to the cylindrical tube 13 by a rubber grommet 17 is a common brine suction and water replacement conduit 18 of non-corrosive plastic material. Conduit 18 has a curved lower end 17′ extending into tube 13 through grommet 17 at the bottom just above apertures 13a. In normal house operation, the brine and water level L reached is not more than 8 inches from the bottom of the tank B, there being approximately 2 inches of flint gravel G at the bottom of the tank B to distribute brine evenly. Brine is removed from the bottom of the brine tank B through a suction placed on conduit 18 and as this occurs the float 16 drops and arm 14 is pivoted downwardly. Following removal of the brine BR from the bottom of tank B for a regeneration action of the minerals M in tank S and a slow rinse of the minerals, replacement water is introduced through tube 18 until float 16 reaches a predetermined setting, whereupon the arm 14 moves a microswitch as will be described to place the system back into service condition of treating the hard water flowing through softener tank S. The arrangement of refill or replacement water at the bottom of tank B provides for the highest concentration of brine at all times and the unit will operate efficiently with as little as 15 pounds of salt remaining in a typical brine tank B. The common brine and the water replacement line 18, since it is used for draw-off of brine and refill of replacement water, is continually flushed out and thus any clogging is eliminated. Each regeneration cycle forces replacement water in a reverse direction down through the conduit 18. In connection with the tank B and the float 16 thereof, controls are provided as will be described which prevent a water level rise of more than 1½ inches, for example, above the normal level of the water L at the bottom of the brine tank B. Thus, should the level rise to this point, the automatic controls place the system in operation to carry out a brining, slow rise, and fast rinse operation to place the system back in service, as will be described. When this occurs, since the system provides for a by-pass of about 25 percent pressure to the house lines during operation of a recycle, there is a warning given to the householder of any unusual condition. Since any overflow is prevented and brine BR is taken off without loss as it is forced through a brining cycle, no brine is lost. The salt storage is a dry storage since the brine and water level L at the bottom of tank B is only about 8 inches from the bottom. Thus, there is no difficulty in refilling the brine tank with dry salt and no brine can spill over.

Automatic control is provided through proper valve and conduit arrangement and control thereof. The automatic water treating apparatus according to the invention is easily adjusted to provide for a big capacity range of operation. By merely adjusting the height of the float 16 along the rod 15 with which it has a friction fit through rubber sleeves 16′, a greater amount of replacement water may be introduced and a greater amount of brine produced for a greater capacity operation. Optimum conditions of use of minerals have been determined by the mineral suppliers and it is an object of this invention to provide an automatic water softening apparatus that will economically and automatically make best use of the supplied minerals. Some of the requirements of the mineral manufacturers to provide best performance is that softening shall take place on downflow, backwash should be on upflow at a rate of between 4–5 gallons per square foot of minerals per 10 minutes. However, in the apparatus according to this invention provision is made for the equivalent of 6 gallons per minute per square foot for 10 minutes of upflow backwash. Brining and slow rinse is a downflow operation as is the fast rinse which immediately follows just prior to the return of the apparatus to service condition.

Figure 2:
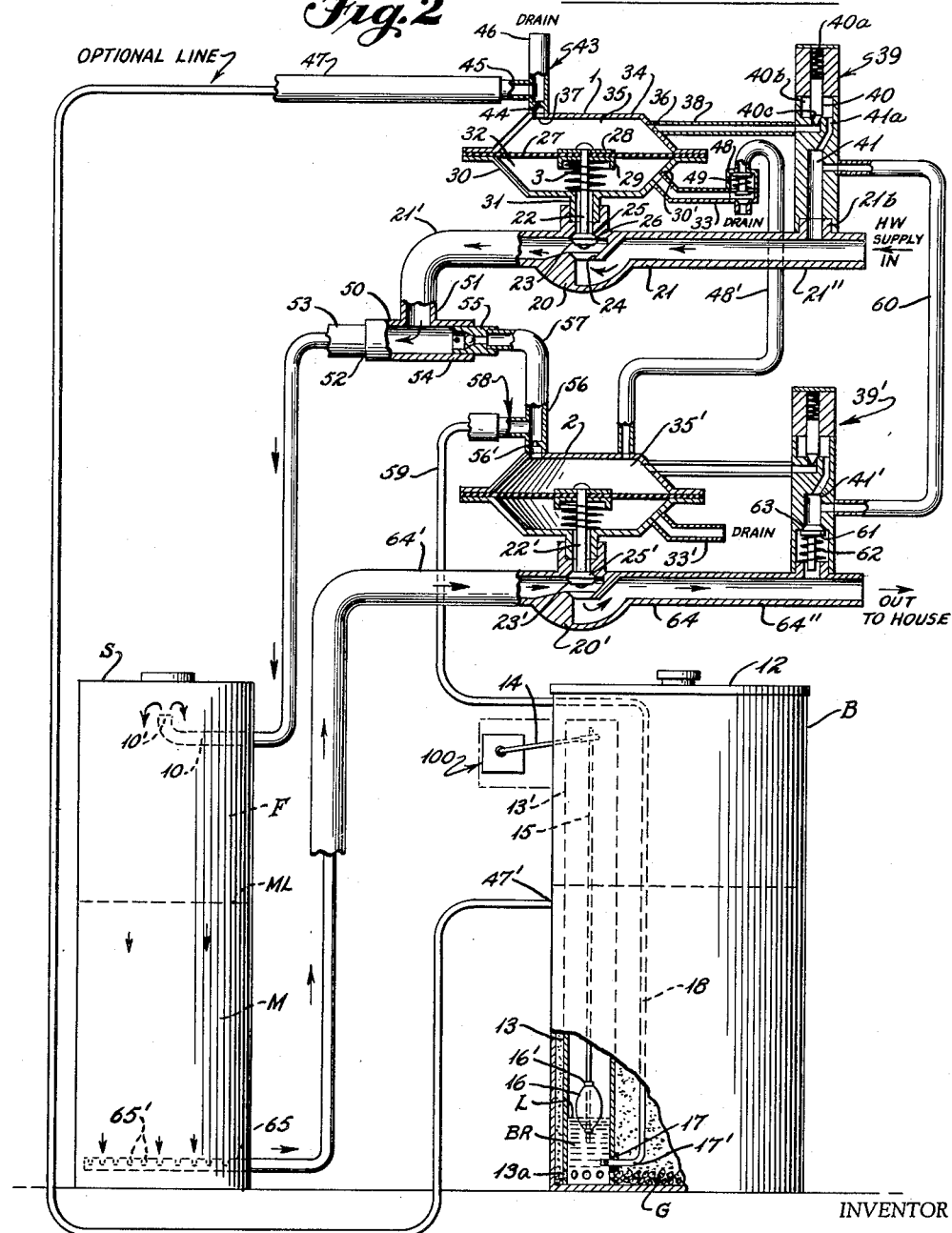
FIG. 2 is a side elevation of the system with some of the valve mechanism and conduits shown on an enlarged scale.

Referring to FIGURES 1 and 2, these figures show a valve unit 1 and a valve unit 2 which in the illustration are diaphragm operated units, however, piston or other actuators may equally as well be utilized. Units 1 and 2 are of like construction and unit 1 will be described. A valve body 20 is connected in a hard water supply line 21 having a first portion 21′ leading to the softener tank S and a second portion 21″ connected to a hard water pressure supply HW. Unit 1 has a first valve element 22 with valve washer 23 seating on valve seat 24 in body 20 and a valve washer 25 seating on valve seat 26 in the body 20. A flexible diaphragm 27 is connected at the top of valve element or rod 22. A rigid top washer 28 and a lower cup-shaped rigid washer 29 make a firm connection between element 22 and diaphragm 27. A lower half cup-shaped member 30 having a downwardly extending neck 31 is connected in the top of valve body 20. A passageway is formed by neck 31 about element 20 so as to provide communicatoin between conduit 21′ and the lower chamber 32 between diaphragm 27 and member 30. A spring 3 is positioned between washer 29 and member 30 urging the first valve element into up or service position. The member 30 is apertured at 30′ and to aperture 30′ is connected a drain line 33. An upper half cup-shaped member 34 forms a pressure chamber 35 with the upper side of diaphragm 27. The upper half member 34 has two apertures 36 and 37. To aperture 36 is connected a hard water pressure branch line 38 which leads to a solenoid controlled control valve unit 39. Unit 39 has a spring loaded valve 40 by spring 40a. The bottom of valve unit 39 has a passageway 41 which is connected to a branch 21b of line 21. A passageway 41a in valve body 39 communicates at its lower end with passageway 41 and at its upper end with chamber 40b. In the valve unit 39 is a seat 40c at the base of chamber 40b and valve 40 seats on this seat 40c to interrupt flow of hard water under pressure from the hard water pressure supply HW to branch line 38 leading to pressure chamber 35 of valve unit 1.

Attached to valve unit 1 and particularly the top half 34 of the pressure actuator at aperture 37 thereof is a first ejector 43 having a jet orifice 44 therein, a suction line 45 and a discharge line 46 that leads to a common drain of the system. Suction line 45 is connected by a suction line 47 leading to the brine tank B at a high level 47' thereof to provide for an emergency suction on the brine tank should the water level ever rise that high in brine tank B.

A cut-off valve 48 is positioned in drain line 33 adjacent the valve unit 1 and it is biased opened by a spring 49. This valve 48 is pressure actuated and a conduit 48' leads from the pressure chamber 35' on valve unit 2. Thus when the chamber 35' of unit 2 is pressurized, cut-off valve 48 closes the drain from valve unit 1.

The position shown for both valve units 1 and 2 in FIG. 2 is a service position wherein both solenoid controlled valves 39 and 39' are closed.

A fitting 50 is connected at 51 with line 21' of unit 1 while a line 53 leads from connection 52 on the fitting 50 to the distributor line 10 in the top of softener tank S. A check valve 55 is connected to the remaining connection 54 of the fitting 50. An ejector 56 on valve unit 2 is connected to the pressure chamber 35' thereof. The discharge line 57 from the ejector 56 is connected to the fitting 50 through the ball check valve 55. This check valve 55 closes when hard water pressure in line 21 is applied when valved element 23 is off of its seat 24. Ejector 56 has an orifice 56' therein and its suction connection 58 is connected by a conduit 59 to the common brine suction and water replacement line 18 in the brine tank B.

A by-pass line 60 is connected at one end to the hard water supply of passage 41 in valve unit 39 and at its other end to passage 41' in control valve unit 39'. In the bottom of unit 39' is a check valve 61 which is spring loaded at 62 to seat against a seat 63 to permit passage of hard water to a service line 64. Service line 64 has a first portion 64' and a second portion 64". The first portion 64' extends between valve body 20 and the soft water fitting 65 adjacent the bottom of the softener tank S. Fitting 65 is of plastic material and has a plurality of transverse slots 65' in the top thereof.

Valve unit 2 has similar parts to those of valve unit 1 including the valve element 22' having valved elements 23' and 25'. The second portion 64" of the service line 64 leads to the house connection to supply soft water. Check valve 61 permits a by-pass of hard water to the house connection or service line 64" when valve unit 1 is actuated. Through this by-pass line 60 and the check valve 61 hard water pressure is provided for temporary house use and for backwash through valve unit 2 to the soft water service outlet 65 of softener tank S when valve unit 1 is actuated to cut off hard water pressure to the top of the softener tank S. The backwash cycle will now be described.

*Backwash*

Reference to FIG. 3 shows the position of the first valve element 22 and the second valve element 22' and the valved elements thereon. A control circuit is shown that energizes solenoid 39s of valve 39. An electrical power supply of 110 volts is indicated and one conductor 66 leads to one terminal of solenoid 39s while the other power lead 67 leads to a terminal D which is connected by a conductor 68 to a movable power switch leaf spring 69. Element 69 is controlled by an actuator pin 70 in a clock mechanism to be described. A pair of spring contacts 71 and 72 are in circuit together and are actuated by steps 74' and 74" on a cam 74 which cam is operated by the clock mechanism. Contact 69' on power element 69 touches spring contact when pin 70 carried by an actuating arm allows element 69 to move to its illustrated position. A circuit is completed through 71 to a conductor 75 connected to terminal C of the terminal block. Terminal C is connected by conductor 76 to the other terminal of solenoid 39s.

When solenoid 39s is energized, as shown in FIG. 3, valve 40 is pulled up against spring 41 and off of its seat 40c allowing hard water pressure to enter conduit 38 and pressurize chamber 35. Orifice 44 of ejector 43 is smaller than the orifice at seat 40c thus pressurizing chamber 35 and forcing diaphragm 27 downward to move first valve element 22 downward. Orifice 44 of the ejector 43 vents chamber 35 when control valve 39 closes. In the position shown in FIG. 3, valve washer 23 seats on seat 24 and closes off hard water supply through conduit 21. Valve washer 25 unseats from its seat 26 and a passage from conduit 21', the first portion of conduit 21 is thus provided through the neck 31 by the valve element 22 into lower chamber 32 and out to the drain 33. Thus, the pressure is relieved at the top of softener tank S and the distributor 10. At the same time that softener tank S is depressurized, hard water pressure from by-pass 60 unseats check valve 61 from its seat 63 and allows hard water under pressure to pass through service line 64, past valve seat 24', on to the soft water connection 65 of the softener tank S. The backwash water passes up through the mineral M in softener tank S and flushes out any residue including iron particles and turbidity particles. Tank S discharges the backwash through distributor 10 to conduit 53, through fittings 50, connection 51 and on to conduit 21' which leads to drain 33 through valve unit 1 as described. This backwash takes place in about ten minutes in this particular set-up of this system.

*Brining and Slow Rinse*

The next cycle of the regeneration as controlled by the control mechanism, here illustrated as a time mechanism, is that of brining and slow rinse, a downflow travel of brine and rinse water through the minerals M in the softener tank S. Reference to FIG. 4 shows this cycle of the regeneration. In this cycle both of the solenoids 39s and 39's' are energized by the control circuit as illustrated. Solenoid 39s has remained energized as in backwash and first valve element 22 is down as in position of backwash. Brine is supplied through ejector 58 as is the slow rinse water.

The circuit for solenoid 39s is continued as in FIG. 3 for backwash. In addition, cam 74 has been rotated further clockwise by the timing mechanism, contact 72 has moved to the right to make contact with contact spring 73. Spring contact 73 is connected to a conductor 77 leading to terminal A. A conductor 78 leads from terminal A and 77 to a terminal contact 80 of a microswitch 79 generally indicated at 79, thence through movable leaf spring 81 in the microswitch 79 to conductor 83 which leads to one terminal of solenoid 39's'. The other terminal of solenoid 39's' is connected to the other side 66 of the 110 v. power supply by a conductor 84. The purpose of the microswitch 79 having the externally actuated movable contact lead 81 will be hereinafter described in the fast rinse cycle.

In carrying out the brining and slow rinse, both the first valve element 22 and the second valve element 22' are moved downward by their actuators, pressure diaphragms 27 and 27' respectively, here illustrated.

The pressurization of chamber 35' of valve unit 2 by hard water pressure from by-pass 60, through control valve 39' and conduit 38', moves second valve element downward, valve washer 23' seats against its seat 24' in valve body 20' cutting off water flow in the second portion 64" of service line 64. The movement of valve washer 25' off of its seat 26' opens a passageway in the valve body 20' from the first portion 64' of the service line to the second valve element 22' in the neck 31' and on through lower chamber 32' to the drain 33'. Thus, the line 64' attached to the soft water discharge fitting 65 of softener S provides a drain to the softener tank S. The jet orifice 56' in ejector 58 is of a smaller size than the orifice at valve seat 40'c' of control valve 39' and pressure is built up in chamber 35'. Jet orifice 56' is of such size that hard water under pressure passes therethrough to draw the brine from brine tank B through conduits 18 and 59 and after brining a slow rinse is provided therethrough. The brine and water mixture from jet 56' is discharged by the ejector 58 through check valve 55 and through fitting 50 to the top of tank S. Cut-off valve 48 has been pressurized through conduit 48' connecting its pressure actuating side with pressure chamber 35' of valve unit 2. Thus, the drain portion 33 of the first valve unit 1 has been closed. With the closure of the cut-off drain valve 48, valve unit 1 is isolated and the brine passes from ejector 58, through check valve 55, fitting 50, line 53, and distributor 10, to the top of the softener tank S. The brine passes through the minerals M thereby treating same and is discharged through fitting 65, line 64', through valve body 20' by seat 25', through the neck 31' about the valve element 22' and on to chamber 32' and drain 33'.

As the cam 74 rotates further clockwise, step 74' will let spring contact 71 move to the right out of contact with the power contact 69, 69' and the circuit to solenoids 39s and 39's' will be broken, however, a holding circuit is provided as shown in FIG. 5, to energize solenoid 39's' and hold the second valve element 22' down as will presently be described for a fast rinse.

The slow rinse that takes place during the brining and slow rinse cycle takes about 20 minutes for the particular set up of the illustrated system to carry out the proper regeneration of the mineral M and its slow rinse. After the brine BR has been drawn off from the bottom of the brine tank B, by ejector 58, hard water for slow rinse passes through ejector 58 and by the same conduits on through check valve 55 to the top of the softener tank S.

The fast rinse will now be described.

*Fast Rinse*

The fast rinse is the last one of the regeneration cycles. Reference to FIGS. 5 and 8 show the valve positions and circuit arrangement.

The second valve element 22' as shown in valve unit 2 is in the down position as solenoid 39's' is energized as in brining and slow rinse, just described above. The position and arrangement of valve unit 2 is thus the same as shown in FIG. 4 and the softener tank S is still draining through valve unit 2 by the second valve element 22' and to the drain line 33'. Solenoid 39's' receives its energization, as shown in FIG. 8 and the circuit in FIG. 5. One side 39'S'–b' of the solenoid 39's' is connected to the line 66, as before, leading to one side of the 110 v. power supply. The other terminal 39'S'–a' of the solenoid 39's' is now supplied through line 83, microswitch 79 contacts 81 and 82, line 85, terminal D and power lead 67 connected to terminal D. The movable contact 81 of the microswitch 79 has been moved to upward contact 82 since the arm 14 operated by float rod 15 has pivoted operator 81' for contact arm 81, see FIG. 10, out of contact with the movable member 81 of microswitch 79.

For a fast rinse, hard water is supplied at full supply line pressure through line 21 of valve unit 1 and past the valve seat 24 which has been opened by the washer 23 having moved upwardly. Seat 26 is closed by valve washer 25 seating thereagainst and all the hard water it passes on to the first portion 21' of supply line which leads to the top of softener tank S. The hard water line pressure seats check valve 55 as the pressure in the fitting 50 is greater than the lower pressure supplied through the orifice 56' of ejector 58. The by-pass line pressure applied to chamber 35' passes through orifice jet 56' and on down the line 59 to the common brine suction and water replacement line 18 in the brine tank. The replacement water enters the bottom of brine tank B to make a new batch of brine from the dry salt supply therein. Float 16 which had moved with its float rod 15 to the bottom of cylinder 13 now gradually rises and arm 14 is pivoted, whereupon the actuator 81', see FIG. 10, for the microswitch 79 pivots back to normal position and moves arm 81 of microswitch 79 to down position so that it contacts contact 80.

In FIG. 6 there is shown a combined control circuit. Certain control circuits for various phases of the operation incorporated in this combined circuit have already been described in connection with Softening or Service—FIG. 2; Backwash—FIG. 3; Brining and Slow Rinse—FIG. 4; and Fast Rinse—FIG. 5. In addition, in FIG. 6 there is shown a clock motor 86 having a power lead 87 leading to terminal B of the terminal block 88, terminal B being connected to power line 66. The other conductor to clock motor 86 is 89 and it leads to terminal D that is connected through jumper 90 to terminal E and thence to power line 67 to power supply.

Also in FIG. 6 there is shown a pair of pivotally mounted mercury switches 91 and 92 that are normally in off position shown. Switch 91 has one contact 93 connected by lead 93a with block terminal E that is connected to power lead 67. The other terminal 94 of switch 91 is connected by lead 95 to terminal C and thence to line 76 to one side of solenoid 39s, namely its terminal 39s–a. Switches 91 and 92 are so mounted that when pivoted to closed position switch 91 closes slightly ahead of switch 92 in point of time. Lead 95 is connected to terminal 95 of switch 92 and supplies power thereto when switch 91 is closed. As switch 92 closes, it being pivotally mounted with switch 91 as at pivot 96, its other contact 97 is powered and furnishes power through lead 98 that is connected at 83' to conductor 83. Conductor 83, as previously described, feeds to the terminal 39's'–a' of solenoid 39s. Each of the other terminals of solenoids 39s and 39's', namely, terminals 39s–b, and 39's'–b' are tied in to terminal B and the other side of the power line 66 as shown. Thus, when the microswitches 91 and 92 are pivoted, a secondary circuit is completed to the solenoids 39s and 39's' and the cycle of Brining and Slow Rinse is initiated as shown in FIG. 4. This occurs when the microswitches 91 and 92, as shown in FIG. 7, are pivoted by a "Guest" or manual push button 99, spring loaded in up position by spring 99', when its plunger 99" strikes operating rod 96' fixed to the mounting of switches 91 and 92. The pivotal mounting of switches 91 and 92 in the path of an actuator 111 connected with float operated arm 14 and when the replacement water enters the bottom of brine tank B, the pivotal mounting is pivoted back to horizontal position for switches 91 and 92; see FIG. 6, and their circuits are opened.

In FIG. 9 there is shown a view of part of the timer generally indicated by 100. The power spring contact lead 69 is in power feeding position in its full line position. Pin 70 on arm 101 when rotated clockwise, as shown, moves power lead 69 to broken line position where it is out of power feeding contact with spring contact 71.

Figure 11:
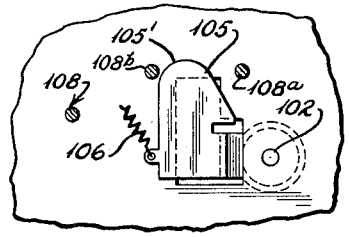
FIG. 11 is a fragmentary view of the timer control taken along line 11—11 of FIG. 12.
Figure 12:
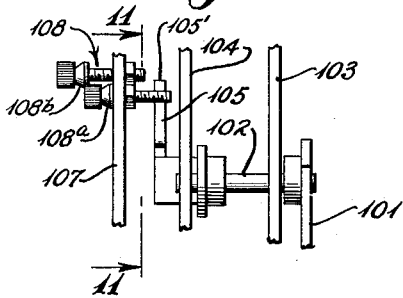
FIG. 12 is a fragmentary view of the time control taken along line 12—12 of FIG. 9.

Pivot shaft 102, as shown in FIG. 12, extends through frame plates 103 and 104 to a position where its other end is rigidly connected with an arm 105. Arm 105 has a camming surface 105', as shown in FIGURES 11 and 12, and is spring biased by spring 106 as shown in FIG. 11. A clock face plate 107 is shown in FIG. 12 and in it are threadedly received adjustably mounted timing screw members generally indicated at 108. To set the clock for actuation, a screw is screwed out, as example, screw 108b. The action that takes place as screw 108b passes cam 105' is that arm 105 is not moved. This allows the arm 101 carrying pin 70 to remain stationary and thus the power spring leaf 69 is in its full line position, see FIG. 9, so that it contacts and makes a circuit with leaf spring 71 which has been brought into contact therewith by action of cam 74, see FIG. 3. So also as the cam 74 rotates further clockwise, see FIG. 4, leaf spring 72 contacts 73 to complete a further circuit.

In order to not feed power from leaf spring 69 to leaf spring 71, arm 101 carrying pin 70 must be pivoted clockwise into broken line position, as shown in FIG. 9, to move contact spring 69 to the broken line position whereupon no circuit is completed to 71, 72 and 73. By screwing in a screw such as 108a, see FIG. 12, it will make contact with cam surface 105' of arm 105, arm 105 is pivoted and pivot shaft 102 likewise pivots arm 101 carrying pin 70.

Manual Initiation of Regeneration

Figure 10:
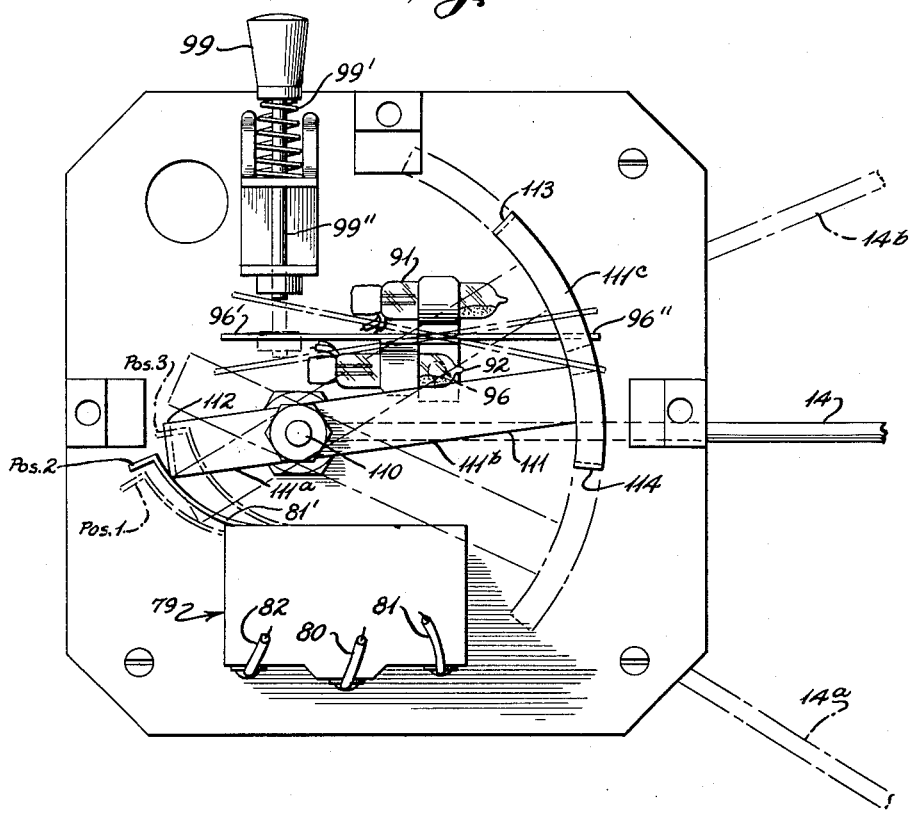
FIG. 10 is another view associated with the combined timer and operating mechanism as controlled by the float actuation.

The normal position of microswitch 79 is with its contact arm 81 contacting contact 80, as shown in FIGS. 4 and 6. An actuation arm 81' operably connected with arm 81 is shown in FIG. 10. Three positions are shown for arm 81'; positions marked Pos. 1 and Pos. 2 are in effect alike to close contact arm 81 with contact 80. Position marked Pos. 3 for arm 81' is the up position caused by rotation of float arm 14 as will be described. When in position Pos. 3, the contact arm 81 makes contact with contact 82, see FIGS. 5 and 8, to complete a secondary energization circuit to solenoid 39's' so as to carry out the fast rinse as shown in FIG. 5.

When extra cycling above the set automatic operation is desired as when additional soft water is desired as a greater amount of soft water is being used, the manual or "Guest" button 99 is pressed down. This moves rod 99" into contact with pivot arm 96', see FIGS. 7 and 10, and the mercury switches 91 and 92, as previously described, completes the circuit to energize solenoids 39s and 39's' to initiate a Brine operation which is automatically followed by Fast Rinse and return to Service condition of the apparatus.

Figure 14:
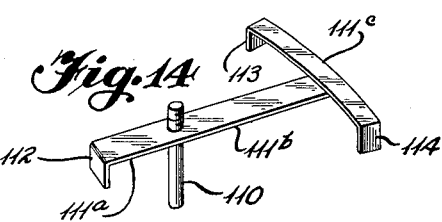
FIG. 14 is an isometric view of a part of the float controlled mechanism for actuating certain switches.

In FIG. 10 the float arm 14 control mechanism is illustrated. Arm 14 is rigidly mounted on a pivot shaft 110. Rigidly attached to shaft 110 is a T-shaped arm 111, see FIG. 14, and it has a tail portion 111a and a head portion 111b. Tail portion 111a has a transverse arm 112 which strikes against and actuates the microswitch actuator arm 81'. The cap of the T-shaped arm is shown at 111c and it has transversely extending arms 113 and 114 at the ends of the cap 111c.

When the brine is removed from the brine tank B by ejector 58 in a brining operation, float 16 and its rod 15 moves down in tube 13 and arm 14 pivots clockwise to position 14a as shown in FIG. 10. As arm 14 pivots to position 14a, the T-shaped arm 111 rigid therewith also pivots clockwise to the broken line position shown in FIG. 10 and arm 112 on 111 allows arm 81' of microswitch 79 to assume the upper position, while arm 113 on cap 111c strikes rod 96" on the mounting for mercury switches 91 and 92 to reset them in a generally horizontal position, see FIG. 6, so that their circuits are interrupted. The microswitch 79 provides the circuit arrangement as shown in FIG. 8 to maintain energization of solenoid 39's' to carry out the Fast Rinse cycle. As the float arm 14 comes back to horizontal full line position, see FIG. 10, the microswitch arm 81' breaks the contact between 81 and 82 and returns 81 to a position of contacting contact 80, see FIGS. 4 and 6.

Emergency Overflow of Brine Tank

In case the replacement water in brine tank B reaches an above normal height by a few inches, the float 16 and its rod 15 will be raised. Float arm 14 will be moved into the position 14b, see FIG. 10, and arm 111 will also pivot to upper position shown in broken line in FIG. 10. Arm 114 on 111c will strike arm 96" of the switch mounting for mercury switches 91 and 92 to move them into contact position, as shown also in FIG. 7, however, the manual or "Guest" push button 99 there shown will have remained in its full line position as shown in FIG. 10. When switches 91 and 92 are closed by their counterclockwise pivoting, a cycle of regeneration of Brining and Slow Rinse followed by Fast Rinse will take place. When float arm 14 is in position 14a, the arm 112 will have moved contact arm 81 into contact with contact 82 to energize solenoid 39's' to provide for the Fast Rinse cycle. Replacement water will be introduced into the bottom of the brine tank and float arm 14 will come back to normal and the microswitch 79 will cut off the circuit to solenoid 39's' to return the system to a service condition.

The unscheduled regeneration of the system will be a warning to the householder that a possible repair of the system may be necessary.

Modification

The modification of the valve assembly apparatus as shown in FIGS. 15–29 inclusive, is now described.

Reference to FIG. 15 shows in the apparatus the customary brine tank B as heretofore described having the common brine suction and water replacement line 18, a float assembly 16 and a control arm 14 leading to the timer mechanism 100 as before. Also the softener tank S has an inlet pipe 10a—10b, a bed of minerals M extending up to about half the height of the tank as indicated by the level ML. Free board area extends from above the mineral bed to the top of the tank S where the inlet fitting 10a having an upstanding portion 10b terminates in spaced relation below the top of the softener tank. This inlet 10a—10b serves as the inlet for hard water to be treated and in the regeneration acts as the drain line for the backwash that is upflow and thereafter acts as inlet for the brine and rinse water which are downflow as is the service flow through the tank.

The timer control mechanism is indicated at 100 as described before, however, the compact valve assembly in this modification is generally indicated at 200. This valve assembly is illustrated in the various figures including FIGS. 16 through 29 inclusive. This valve assembly generally indicated at 200 in the modification here shown is about 4 inches square and a little over 3 inches high exclusive of the fittings and solenoids for actuating the valves. The valve body may be made of suitable casting metal which is easily machined as necessary and may also be of suitable plastic material.

The valve body or assembly generally indicated at 200 is made up of three sections as shown in FIG. 17, namely, a top section 200a, a middle section 200b, and a bottom section 200c, having suitable gaskets between sections that are held together by four cap screws 200s at each corner received in through apertures in the sections and threadedly received in threaded apertures in the bottom section 200c.

In the make up of this valve assembly three sections are here illustrated and certain passageways are made up of complementary sections in cooperating adjacent sections which assist in the ease of manufacture, assembly and repair.

Figure 22:
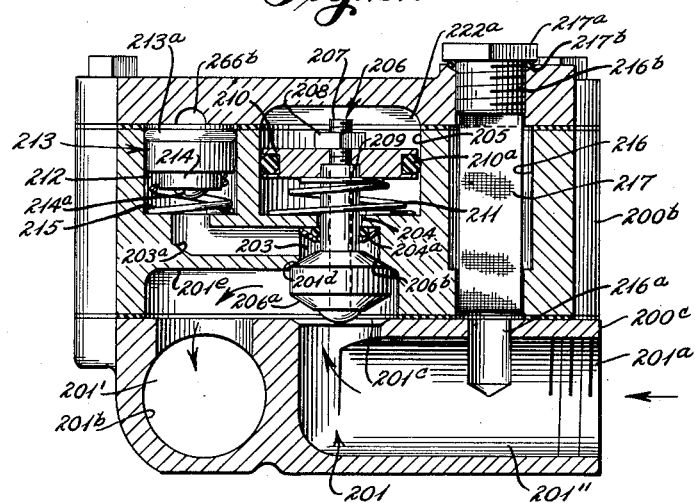
FIG. 22 is a sectional view along line 22 of FIG. 16 showing the supply passageway and valves associated therewith.

Reference to FIG. 22 shows a hard water supply passageway generally indicated at 201 having an inlet end 201a, an outlet end 201b, both in the bottom section 200c. In FIG. 24 at the other side of the valve assembly is a service passageway generally indicated at 202 through which in service condition of the valve assembly, water that has been treated to soften it passes to the house connection 202b as will later be described. The passageway 201 is offset transversely in the bottom section 200c to form a valve seat 201c which divides the whole passageway into a first portion 201' including the cavity 201e in the bottom of middle section between the valve seat and the outlet 201b and the second portion 201"

between the inlet 201a and the valve seat 201c. Also in this passageway 201 that extends in the bottom of the middle section 200b of the valve body is a valve seat 201d leading to a drain passageway 203 as will be described.

The valve seats 201c and 201d are in vertical alignment and on the vertical axis therethrough in the middle section 200b there is from bottom to top, the valve seat 201d, a first valve element drain cavity 203, a reduced bore 204 for receiving a first valve element 206 as will be described, and a first valve element pressure actuator chamber 205.

The first valve element generally indicated at 206 has a valve stem or bolt 207 threaded at its upper end to receive a nut 208 which holds assembled thereon a first valved means 206a, a rubber washer, cooperating with valve seat 201c, a second valve means 206b, also a rubber washer, thereabove cooperating with the valve seat 201d, a sleeve 209 of composition such as "nylon" which extends up through the bore 204 and seats in a recess in the bottom of a pressure actuator 210 having an O-ring 210a thereon to form a seal in the pressure chamber 205, all of said parts being held on the valve stem or bolt 207 by the nut 208. Positioned between the bottom of the pressure actuator plate or piston 210 and the bottom of the pressure actuator cavity or cylinder 205 is a compression spring 211 urging the first valve element 206 upward so that the second valve means thereon 206b seats against the seat 201d so as to close off communication between the first portion 201' of the supply passageway and the drain cavity 203.

It is desired that there be no communication between the drain passageway 203 and the bottom portion of pressure actuator cylinder cavity 205 below the actuator 210 therein and thus there is provided a seal assembly about the sleeve 209, as indicated at 204a, which includes an O-ring and retainer there shown.

Still referring to FIG. 22 there is connected to the drain cavity 203 in the middle section 200b of the valve body, a drain passageway 203a which leads to the bottom of a drain cut-off valve pressure actuator chamber 212 that extends vertically in the middle section 200b and receives the drain cut-off pressure actuator piston generally indicated at 213 having an O-ring 213a thereon. The piston assembly 213 includes a reduced diameter rubber washer 214 which is suitably held assembled with the cut-off actuator 213 by means of a bolt and nut assembly generally indicated at 214a and which seats against the bottom of chamber 212 to close off the drain entry passageway 203a. A compression spring 215 is positioned in the bottom of the chamber 212 and seats around the member 214 against the bottom of actuator 213 and urges it upward.

Also shown in FIG. 22 is a vertically disposed screen-receiving cavity 216 which extends through the middle section 200b and has a lower opening 216a communicating with the hard water supply passageway second portion 201". The screen-receiving passageway 216 receives a cylindrically shaped screen 217. The upper end of screen 217 extends into an internally threaded aperture 216b in upper section 200a. Threaded aperture 216b receives a special securing cap screw 217a that extends at its reduced lower end into the top of screen 216. A sealing washer 217b seals cap 217a in section 200a. Control pressure water and bypass water, as will be explained later, passes through this screen 217 and passes through the cavity connected therewith, as indicated at 216c in FIG. 19 in the middle section 200b of the valve body.

Figure 18:
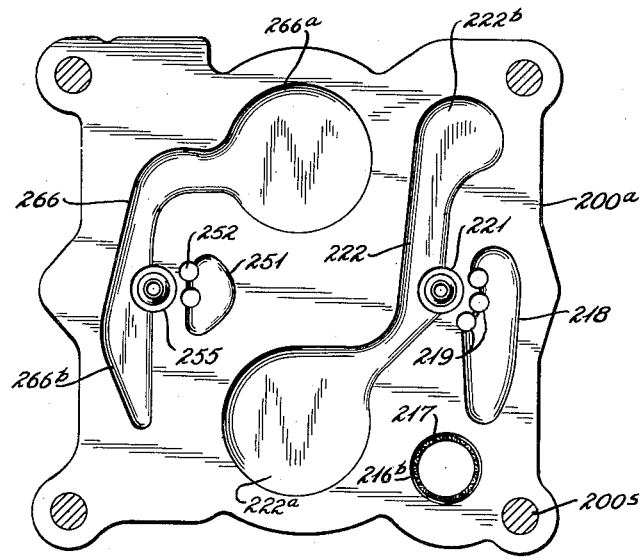
FIG. 18 is a sectional view along line 18—18 of FIG. 17 looking into the bottom of the top section of the valve assembly.
Figure 23:
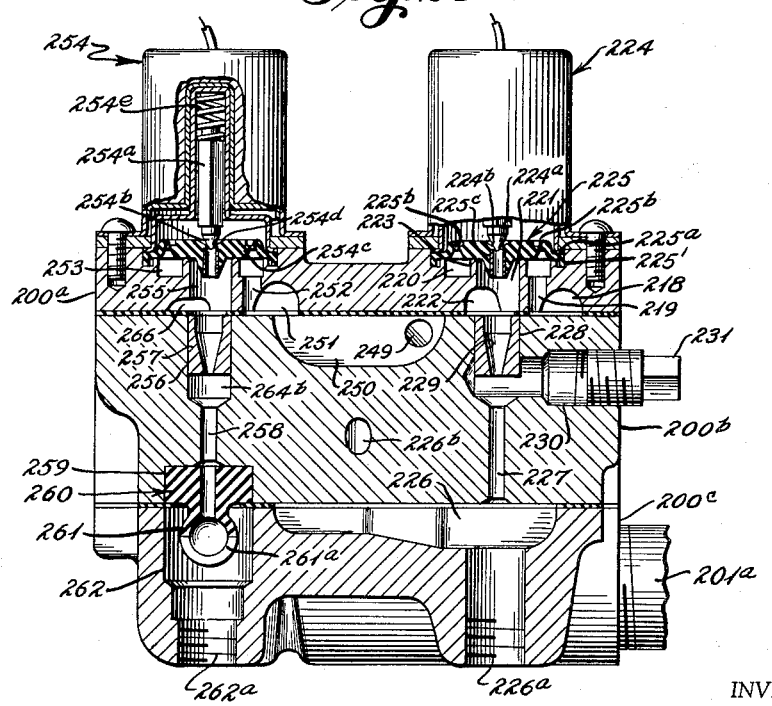
FIG. 23 is a sectional view along line 23—23 of FIG. 16 showing the solenoid actuators for the valves in partial cross section, certain passageways, jets, and check valve.

Referring to FIG. 18 a first control pressure channel way comprises the channel way 218 formed in the bottom of the top section 200a which is generally oval and elongated in shape and extends over to and above an end part of the cavity 216c to receive water therefrom and conduct it through the three vertical channel ways 219 as shown in FIG. 18 and one in section in FIG. 23 at 219 to an annular open face cavity 220 in the top of valve body 200a, thence to the co-axial passageway 221 within annular cavity 220 in the top section 200a. Vertical passage 221 is in communication with the balance of the first control pressure channel way 222, as indicated in FIGS. 18, 22 and 23. It will be noted that in FIG. 22 the channel way 222 extends to be in alignment and in communication with the cylindrical cavity 205 so as to apply pressure to the first valve element pressure actuator piston 210.

It will be noted that the annular cavity 220 and the coaxial inner cylindrical cavity 221 are separated by a wall 223 which forms a seat on the top thereof to receive a standard type of solenoid valve generally indicated at 224. The solenoid valve 224 has an armature 224a therein with a needle-like valve point 224b which seats in the center of a composition diaphragm generally indicated at 225 having a depending rim portion 225a received within an annular recess 225" in section 200a. The diaphragm 225 has spaced apart apertures extending through the rim thereof as indicated at 225b so that water under pressure may pass therethrough from the annular cavity 220 to the top of the diaphragm 225 to hold it seated on the seats 223 when the needle valve 224b is seated to close off the orifice which extends axially through the diaphragm at 225. Thus, when the solenoid 224 is actuated to lift the armature 224a, the needle-like valve point 224b is lifted and orifice 225c is opened so that the pressure is reduced above the diaphragm 225 and thus the diaphragm lifts by the pressure acting in the annular cavity 220 and water under pressure flows over the valve seat 223 into the coaxial inner passageway 221 and thence to the cavity 222.

Referring to FIG. 23, a common drain cavity is indicated at 226 in the bottom section 200c of the valve body and this cavity leads at one end to a vertical drain connection 226a to which a drain line may be attached. This drain cavity 226 is also shown in FIG. 21 which is a top plan view of the lower section 200c. In line with this drain cavity and the drain connection 226a therein, is a vertical passageway 227 leading to a jet cavity 228 thereabove which communicates with the passageways 221 and 222 and is axially in line and below the orifice 225c controlled by the solenoid valve 224. Housed in the orifice cavity 228 is a restricting jet orifice 229. A passageway or bore extends transversely to the passageway 228 and communicates therewith as indicated at 230 in the body 200b and receives a threaded plug 231. A secondary suction drain line may be attached to the aperture 230 when the threaded plug 231 is removed. When the solenoid valve 224, the first control valve means, is actuated by the control apparatus and jet 229 is placed in operation it directs a stream through the drain 226 and 226a in alignment therewith and places a suction on the common drain cavity 226 and all of the other drains to be described that are connected thereto. The pressurizing jet 229 also pressurizes the channel ways thereabove so as to apply pressure to the first valve element pressure actuator 210 to move the first valve element 206 down against the spring 211 so that the first valved means thereon 206a seats against the seat 201c in the pressure supply passageway to close off the water supply and to interrupt the normal service operation of the valve assembly. In so doing, the second valve 206b unseats from its seat 201d to connect the section 201', the first section of the supply passageway 201, to the drain cavity 203 and drain passageway 203a. Reference to FIG. 28 shows the drain cut-off drain actuator 213 and the rubber valve element 214 associated therewith which closes off the drain passageway 203a in the bottom of the drain cavity 212. Connected to the drain cut-off valve pressure actuator cavity 212 in the valve body mid-portion 200b is a drain passageway 226b leading to the common drain cavity 226 in the bottom section 200c of the valve body. Thus, as will be described later when the cut-off drain actuator 213 is pressurized on top it moves down against the spring 215 and the rubber valve disk 214 seats against the bottom of the cavity 212 to close off the drain passage 203a so as to interrupt the drain connection from 203a through the cavity 212 to the drain passageway 226b and thence to the common drain 226.

Figure 19:
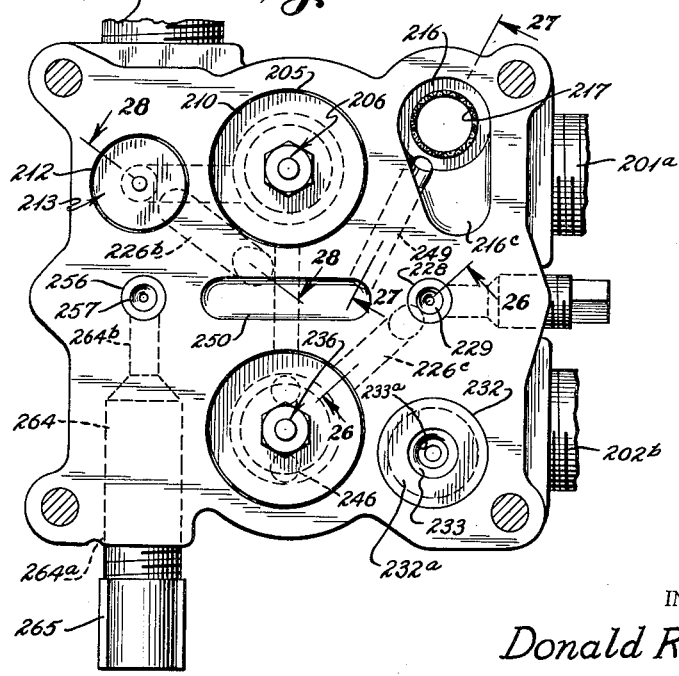
FIG. 19 is a sectional view along line 19—19 of FIG. 17 looking at the top of the middle section of the valve assembly.

Referring back to FIG. 18, it will be noted that one arm 222b of the portion of the first control pressure channel way 222 leads so as to be in position over a vertically extending first check valve cavity 232, see FIGS. 19 and 24, in the middle portion 200b of the valve body.

The vertically extending cavity 232 has a number of stepped bore portions therein as indicated at 232a, the largest diameter portion, a next portion 232b, the smallest diameter portion, and communicating therewith are two additional stepped larger portions 232c and 232d. A restrictor member generally indicated at 233 is mounted in the cavity 232a and has a throttling throat 233a therein which is axially above a check valve generally indicated at 234 mounted in the cavity portion 232d. Check valve 234 is of rubber and has a bulb portion 234a with a slit 234b across the bottom of the bulb portion which when pressure from the service line 202 and particularly the second portion 202″ therebelow acts thereagainst closes the portions of the bulb 234a forming slit 234b and prevents flow upward therethrough. The check valve 234 is held in place by a retainer ring 235. This check valve 234 is a pressure controlling valve in a by-pass line formed by the passageway 222 and 222b leading from the pressure supply 201″ shown in FIG. 22 and described above which provides a communication over to the service line portion 202″. This by-pass provides backwash pressure under throttled pressure conditions which passes through the service line in reverse direction to the bottom of the softener tank S as will be described later. Check valve 234 and the by-pass in which it is positioned provides decreased pressure supply for the service line portion 202″ and the house connection connected at 202b when the valve assembly is carrying out regeneration functions, including backwash and rinse. Thus, the service line portion 202″ to supply water to the house is never without pressure.

Reference is now made to the service passageway 202 and the second valve element 236 particularly shown in FIGS. 24 and 25. The second valve element 236 is made up the same as the first valve element 206 having a bolt or stem 237 threaded at one end to receive a nut 238, a first valved washer 236a which is of rubber or the like that seats against valve seat 202c and divides the service passageway 202 into a first portion 202′ including the cavity 202e in the bottom of section 200b and the section 200c and a second portion 202. Also on the first valve element 236 is an oppositely positioned second valved washer 236b to the valve washer 236a and it seats against the seat 202d. Completing the second valve element 236 is a nylon sleeve 239, a second valve pressure actuator 240 having an O-ring seal 241.

The second valve element 236 is received within the middle section 200b of the main body in vertical cavities consisting of the drain cavity 242 above seat 202d, a stem aperture 243 thereabove which receives and guides the sleeve 239 of the second valve element 236 and a third cavity consisting of the second valve element pressure actuator cavity 244. Received in the upper end of the drain cavity 242 is a ring 245 of nylon which is shown in FIGS. 24 and 25. In FIG. 25 ring 245 is shown with a center aperture to receive the sleeve 239 and two drain apertures 245a extending vertically therethrough to form a communication with vertical spaced apart bores 246, see FIG. 19, which extend from the bottom of the cavity 244 into the drain cavity 242. Compression spring 247 here disposed in the cavity 244 urges the second valve element 236 upward so as to close the second valved means 236b against the seat 202d.

Reference to FIGS. 24 and 26 shows a drain passageway 226c leading from the cavity 244 underneath the second valve element pressure actuator 240 to the common drain cavity 226.

Also in FIG. 25 there is shown an interconnecting passageway 248 which consists of two branches 248a and 248b which are bored downwardly at an angle of about 45° so as to meet and which interconnect the cavities 244 and 205 below the respective first and second valve element pressure actuators 210 and 240. This interconnecting passageway 248 drains off cavity 205 below the pressure actuator 210 therein to release any built-up pressure to the cavity 244 below the pressure actuator 240 that has the drain connection 226c as shown in FIG. 26. In FIG. 24 the upper end of the drain passageway 226c shows up in the lower right-hand corner of the cavity 244. As stated before, the seal 204a about the stem of the first valve element 206 seals off the cavity 205 from the drain cavity 203 of that valve element.

Control pressure for actuating the second valve element 236 and the drain cut-off actuator 213 will now be described. Referring to FIG. 27 the pressure supply strainer well 216 is connected by passageway 249 in the middle section of the valve body 200b with an elongated cavity 250 formed in the upper face of the middle section 200b as shown in FIGS. 19, 23 and 27. This cavity 250 extends across the valve body 200b, as shown best in FIG. 19, between the first and second valve elements generally indicated at 206 and 236. Reference to FIG. 18 depicting the top section 200a where the bottom face thereof is viewed shows a cavity 251 serving a similar purpose to that of cavity 218 and two vertical apertures 252 extend through the top section 200a shown in FIG. 23 in a similar manner to the apertures 219 for cavity 218. The upper ends of the apertures or bores 252 terminate in an annular cavity 253, see FIG. 23, similar to cavity 220 for the pressure actuator control valve 224. A solenoid actuated second control valve 254 like the valve 224 controls flow from the annular channel 253 to the vertical passage 255, the latter passage being similar to the passage 221 in the previously described valve arrangement operated by the solenoid 224. In the middle section 200b of the valve body and axially in line with the passageway 255 is a jet receiving aperture or well 256 within which is received a pressurizing jet 257. The base of the jet well 256 is connected by a vertical bore 258 with a cavity 259 in the bottom face of the middle section 200b to receive a check valve 260 similar to the check valve 234 previously described. This check valve 260 has a bulb portion 261 at its bottom end which is slotted at 261a in its lower half. The bulb portion 261 is received within the vertical aperture 262 extending in the bottom section 200c of the valve body which has a threaded lower end or outlet 262a that is connected by a conduit 263, see FIG. 15, with the softener tank just above the mineral bed upper level ML.

Referring to FIG. 19, there is shown a side passageway 264 in the middle section 200b of the valve body. This passage 264 has a threaded external end at 264a and a reduced throat portion 264b at the inner end which communicates with the bottom of the jet well 256 below the jet 257, as shown in FIG. 23. Connected at the outer end 264a of the passageway 264 is a fitting 265, see FIGS. 16 and 17, having a rubber or plastic tube receiving lower end 265a to receive the tube 59 as shown in FIG. 15 which leads to the common brine suction and water replacement line 18 in the brine tank B.

It will be seen in FIG. 23 that the armature 254a in the solenoid actuated valve 254 has a needle valve end 254b cooperating with the orifice 254d in the diaphragm 254c of the valve assembly 254. A spring 254e urges the armature 254a and the needle valve 254b thereon into closing position with the orifice 254d in diaphragm 254c. When the solenoid 254 is energized the armature 254a is retracted against the spring 254e and the pressure balance is upset about the diaphragm 254c so as to permit control water under pressure to travel from the channel 253 to the vertical passageway 255 and then to the jet 257 as will later be described.

Referring again to FIG. 18, there is shown a second control pressure channel way portion 266 similar to the first channel way portion 222. Channel way 266 is in communication with the bottom end of the vertical passageway 255, see FIG. 23, and a portion 266a that leads over to supply control pressure above the cavity 244 for the second valve element 236 and the pressure actuator 240 there attached and operating in the cavity 244. The other end of the cavity 266 as indicated at 266b extends over the drain cut-off pressure actuator cavity 212 to supply pressure to the drain cut-off pressure actuator 213. Thus, the jet 256, when pressure is applied thereto, backs up pressure in the passageway 266 so as to apply control pressure to both the second valve element 236 and to the drain cut-off valve pressure actuator 213.

Figure 29:
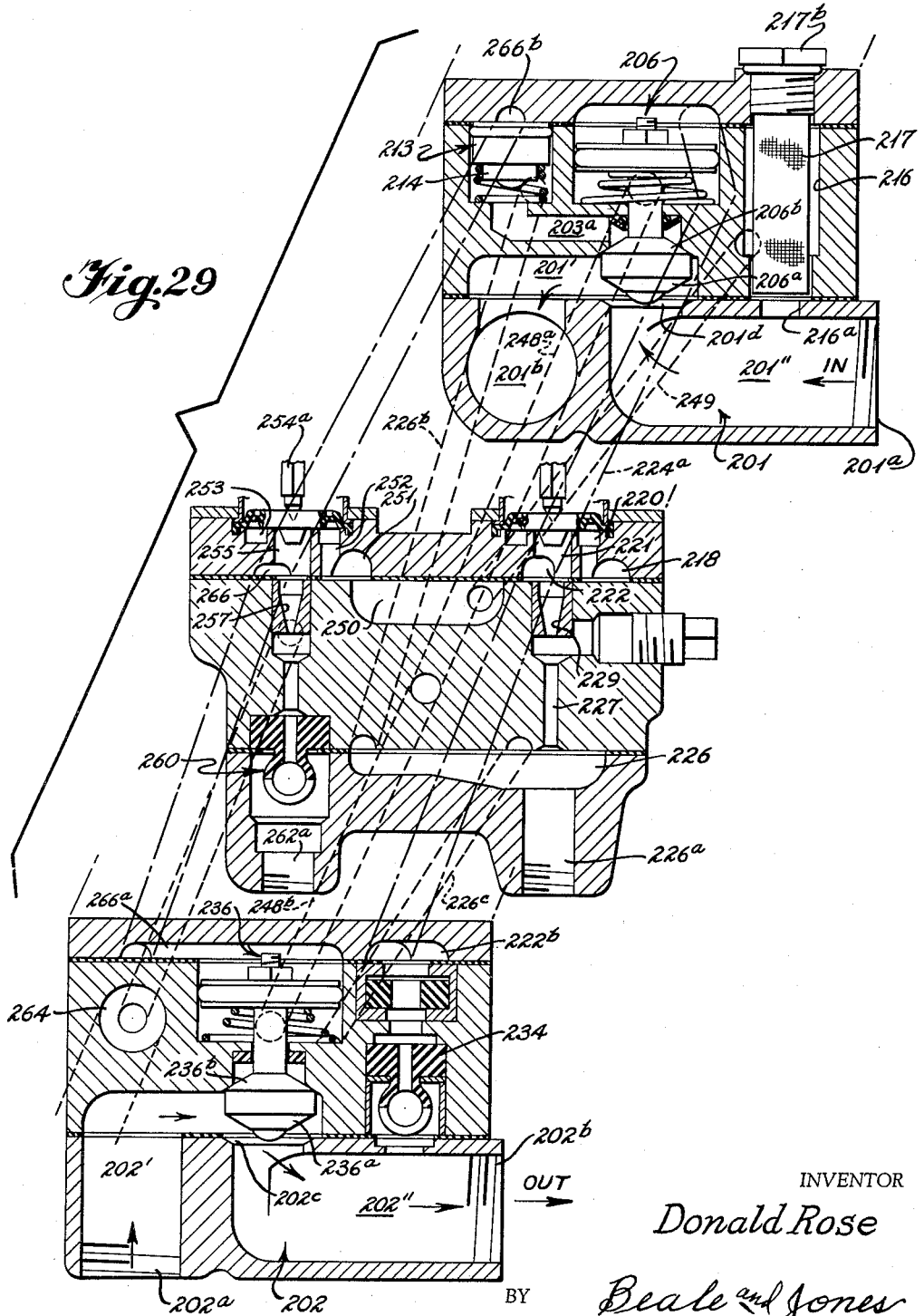
FIG. 29 is an exploded isometric view of certain sections arranged to illustrate interconnecting channel and passageways therein leading to various elements of the valve assembly.

Reference to FIG. 29 shows an exploded isometric view with broken lines indicating certain channel connections and passageways as described in detail above. Showing of the respective valve elements is for a service condition wherein the softener tank S is receiving water at the top where it passes down through the mineral bed and out through the bottom take-off conduit 65 that connects with passageway 202. The position of the respective first valve element 206 and the second valve element 236 in the other views of the valve assembly are for a service condition wherein water is being softened. In such a condition neither of the solenoids in the first and second valve means 224 and 254 respectively are energized.

*Operation of Modification*

In the service or softening operation the hard water supply which is connected at 201a, as diagrammatically shown in FIG. 29, passes through the service passageway 201, past the valve seat 201d, out through the chamber portion 201e and to the outlet connection 201b which is connected by the distributor conduit 10a—10b in the softener tank S. In the softener tank S, water passes downward through the mineral bed M where treatment and softening takes place by the ion exchange principle through the header 65 in the bottom of the softener tank S and thence up to the valve assembly 200 where it enters at 202a into the service passageway 202, past the valve seat 202d and thence out to the house service connection 202b.

The timer mechanism and circuits as previously described for the firstly described apparatus illustrated in FIGS. 1–14 inclusive are utilized with this valve assembly 200 and in the system shown in FIG. 15. It will be noted that the valve elements 206 and 236 are biased upwardly as is the by-pass cut-off activator 213 since the springs respectively thereunder urge them upwards and in the case of the first valve element 206 and a second valve element 236 water pressure also acts on the first valved means 206a for the first valve element 206 and on the first valved means 236a on the second valve element 236.

*Backwashing*

As in the previously described apparatus in FIGS. 1–14 inclusive, backwashing is an upflow operation that loosens the mineral bed and removes foreign deposits on the mineral material. The first solenoid actuator 224 is energized and the armature 224a thereof is raised off its seat so as to apply the first control pressure which follows the path from the supply pressure line portion 201″, passage 216a, through screen 217, the screen well 216, the first control pressure channel way portion 218 in communication with the screen well 216 at 216c, through vertical passageways 219, annular passage 220, thence under the diaphragm 225 and into the vertical passageway 221, pressurizing the jet 229 and placing a suction on the common drain 226—226a. Pressure in the portions, 222a and 222b of the first control pressure channel way 222 applies pressure to the first valve element 206 causing it to move down against the pring 211 so that the first valved means 206a thereon seats and closes against the seat 201d therebelow and interrupts supply passageway 201 and water flow therethrough. As the first valve element 206 moves downward, the second valved means 206b thereon unseats from its seat 202d and opens up the drain 203—203a to the topside of the softener tank S as conduit 10a is connected to passageway first portion 201′ and 201b. Water for backwashing comes from the first control passageway portion 222b that is also pressurized when solenoid 224 is actuated, passes down through the first check valve 234, through the service passageway 202 in the valve body and past the valve seat 202d and thence through passage 202e and 202a to the bottom inlet 65 of the softener tank. This by-pass water pressure is governed by the by-pass through the check valve 234 to supply adequate backwash up through the mineral bed.

Any pressure on the tank S is relieved through the drain 203a which passes through the drain chamber 212 to the drain passage 226b and thence to the common drain 226. The action of the pressurizing jet 229 places a suction on the common drain 226 and thus assists in removing the backwash water. Since the pressure is applied on the drain to form a suction, the drain can be at a higher level than the valve assembly 200 and still move drain water out of the system.

In this operation of backwashing since there is pressure on the softener tank S, pressure feeds up through the line 263 above the normal level of the mineral bed to connection 262a in the valve body so as to apply pressure and close the slot 261a of bulb 261 of the check valve 260. This check valve 260 seals off any movement of water upward therethrough.

*Brine and Slow Rinse*

Following the backwash, the timer of control mechanism as used causes the second solenoid, namely, solenoid control valve means 254 to be energized. The first solenoid 224 is still energized. On energization of solenoid 254 the second control pressure channel way 266 is pressurized. The second control pressure channel way 266 receives a water pressure supply from the pressure supply line portion 201a, the screen well 216, passageway 249 in the valve body 200b, see FIG. 27, cavity 251, vertical passageways 252, annular cavity 253, the water then passes under the diaphragm of solenoid valve 254 and thence down through the passage 255 whereupon jet 257 is presurized as is the second control passageway 266. The second control passageway 266 pressurizes each of its ends 266a and 266b so as to move the second valve element 236 downward against its spring 239 and also move the drain cut-off actuator 213 down so that the rubber washer 214 thereon closes off the drain passage in the bottom of the drain well 212. When the second valve element 236 moves downward the first valved means thereon 236a closes against seat 202c and shuts off any by-pass water and at the same time the second valve means 236b moves down in unison therewith to uncover its seat 202d and provide communication from the first portion of the service passageway 202′ to the drain cavity 242. As viewed in FIG. 25, drain cavity 242 communicates through the vertical passages 246 to the bottom of the second valve pressure actuator cavity 244 and then by the drain 226c, see FIG. 26, to the common drain 226. This action starts a brine operation that is followed by a slow rinse operation. The pressurizing jet 257 places a suction on the line 264 in the valve body see FIG. 19, which is attached to the fitting 265 and to the conduit 59 leading to the common brine and replacement water line 18 in the brine tank B. Brine is drawn up through this brine suction line from the bottom of the brine tank B and is discharged through the passage 262a below jet orifice 257 and thence through the conduit 263 to the top of the bed of minerals in the softener tank S.

This brine regenerates the minerals while the head or free board indicated at F above the mineral bed in the softener tank S is isolated since the supply passageway 201 is closed and the drain cut-off valve 214 is closed. The drain water of the brining operation passes out the conduit 65 in the bottom of softener tank S, through the connection 202a, the first portion 202' of the service passageway 202, past the second valve means 236b on the second valve element 236 past seat 202d, through 242, aperture 246, bottom of well 244 and out through the drain passage 226c to the common drain 226. This common drain 226 is still being augmented by the pressurizing jet 229 so that the drain is given an ejector action through the connection 226a therebelow the orifice passageway 227 below the first jet orifice 229.

As the brine level L in the brine tank B drops, the control actuator arm 14 trips and the circuits, as described previously for the apparatus of FIGS. 1–14 inclusive, causes the first solenoid 224 to be deenergized and the first valve element 206 to move to upward position. A holding circuit, as previously described, maintains the second solenoid 254 energized so that the second valve element 236 is still held in downward position and the service passageway 202 is still closed off by the first valved means 236a on the second valve element 236.

*Fast Rinse*

First valve element 206 is in up position and second valve element is in down position. Pressure is now applied through the supply passageway 201 in the valve body, past the valve seat 201d and thence to the top of the softener tank S and through the filler line 10a—10b. With this pressure applied at the top of the softener tank S, the conduit 263 leading to just above the mineral bed M is pressurized and the check valve 260 thus is pressurized closed so as to prevent water from passing upward therethrough. Pressure is still applied to the jet 256, and it now discharges through what previously acted as the brine suction line 264, through fitting 265, and thence to the conduit 59 to the line 18 which now acts as a water replacement line to place water into the bottom of the brine tank B. Float 16 in the brine tank B rises in response to the proper water level being reached by the replacement water and the actuator arm 14 is moved upward as described heretofore to restore the control circuits. As the full pressure supply from the supply line 201 is applied to the top of the softener tank S, it provides a fast rinse through the mineral bed M which fast rinse is drained off through the conduit 65 at the bottom of the softener tank and through the drain provided by the second valve element 236 which leads to the drain line 226c to the common drain 226. Upon restoring the circuits to service condition of non-energization, the solenoid of the valve means 254 is deenergized, and the second valve means 236 returns to normal or service position whereupon the second valve means 236a thereon moves up off seat 202c restoring the communication between the first portion 202' and the second portion 202" of the service passageway 202 whereupon soft water now being conditioned through passing through the mineral bed passes through the service line 202 to the house connection 202b.

It is to be noted that the slow rinse followed by the fast rinse provided by the apparatus according to this invention carries out the rinsing of the minerals after they have been rehabilitated by the brine cycle in such a manner that the mineral bed is regenerated to handle and to also cope with iron-bearing waters.

It is also to be noted that in this apparatus both the originally described form in FIGS. 1–14 inclusive and in the modification in FIGS. 15–29 inclusive, the brine tank B has no foot valve and is not pressurized. So also the brine tank B carries the reserve salt supply therein in a dry condition, and only the bottom of the salt supply is dampened to form the desired amount of brine in the bottom of the brine tank B.

The apparatus according to this invention as illustrated by the apparatus in FIGS. 1–14 inclusive and the modification as shown in FIGS. 15–29 inclusive uses only two solenoid actuated first and second valve elements each having first and second valve means thereon. There is a minimum of operating parts; nevertheless the appropriate upflow backwash is supplied for the minerals as prescribed by the mineral manufacturer; a slow brining which is a downflow operation under pressure controlled conditions is applied to the mineral bed while the free board in the softener tank is isolated; a slow rinse that is downflow and controlled under reduced pressure is maintained; and a fast rinse that is downflow under full pressure is provided. Adequate automatic control with safety features is provided yet manual operation for additional softening is provided. Flexibility of adjustment is easily provided to change the capacity of the system.

I claim as my invention:

1. A fluid distribution device comprising a first conduit means adapted to be connected to a fluid system at one end and to a source of fluid under pressure at the other end, said conduit means being divided into a first portion containing said one end and a second portion containing said other end, a first valve element movably mounted to occupy a service position and a second position and having first and second valved means thereon positioned in said first conduit means intermediate the first and second portions thereof and in the first service position of the first valve element permitting fluid flow through the first conduit means, conduit means connecting said first portion of the first conduit means with a drain line through the medium of the second of said valved means when the first valve element occupies its second position, to drain the fluid system through said drain, a second conduit means having a first portion and a second portion, said last mentioned first portion being adapted to be connected to another portion of said fluid system and said second portion last mentioned being adapted to be connected to a second fluid system, a second valve element movably mounted to occupy a service position and a second position and having first and second valved means positioned in said second conduit means with the second valved means intermediate the first and second portions thereof and in the service position of the second valve element permitting fluid flow through said second conduit means, conduit means connecting said first portion of the second conduit means with said drain line through the medium of the second of said valved means of the second valve element when the second valve element is in its second position, a by-pass line being connected with said source of fluid under pressure at one end and at the other end to the second portion of said second conduit means and having a valve means therein preventing flow from the second portion of said second conduit means to said fluid supply under pressure; said by-pass line supplying fluid pressure to said second system when either or both the first valve element and the second valve element are in their second position and supplying fluid pressure to said first system when the second valve element is in service position and the first valve element is in its second position, an actuating means for the first valve element, a fluid pressure actuating means for the second valve element, said fluid pressure actuating means for the second valve element having a fluid pressure chamber, an ejector means connected with said fluid pressure chamber and actuated when said fluid pressure actuating means for the second valve element is actuated, said ejector having a suction line and a discharge line, a valve means in said ejector discharge line preventing fluid flow to said ejector; said ejector forcing fluid in a reverse direction to that of suction through said suction line when said valve means therein is closed and pressure is applied to said ejector from said fluid pressure chamber, a fluid pressure actuated cut-off valve in said drain line adjacent said second valve means of the first valve element and a conduit means connecting said fluid pressure chamber of the second valve element actuating means with said last mentioned fluid pressure actuated cut-off valve to actuate the same when pressure is on said fluid pressure chamber.

2. In combination with a water softener having a softener tank, a brine tank, a hard water supply line, a service line, a first valve means in the supply line, a second valve means in the service line, a drain line, means connecting the supply line to the top of the softener tank, means connecting the bottom of the softener tank to the service line, means connecting a portion of the supply line with said drain line through said first valve means, means connecting a portion of the service line with the drain through said second valve means, and means connected with said second valve means and operable therewith for conducting brine from said brine tank and introducing it into said softener tank and supplying replacement water to said brine tank, the improved control apparatus for completing electrical circuits to said first and second valve means comprising, pivotally mounted first and second switches for completing circuits respectively to actuate said first and second valve means, pivotal mounting means for said switches, said first switch being operable to closed position in advance of said second switch closing, said first switch having conductor means connecting it with one lead of a power source and to said first valve means, conductor means connecting said first switch to said second switch to be in series therewith, conductor means connecting said second switch with the second of said valve means, means connecting another lead of said power source to said first and second valve means to complete a power circuit thereto for actuation of the first and second valve means, said closing of said first and second valve means initiating a brining and rinsing operation through said softener tank, means for pivoting said pivotal mounting of said switches to move them to closed position, a liquid level responsive means in said brine tank indicative of high level and low level therein, a secondary electrical switch means for said second valve means, said liquid level responsive means being connected with said pivoted mounting means for the first and second switches and moving them to open position in response to low level condition in said brine tank on removal of said brine, said liquid level responsive means being connected with said secondary electrical switch means to move same into closed position in response to low level in said brine tank, said secondary switch means providing a secondary circuit to said second valve means to maintain same in operating position after said second switch means has been interrupted, said liquid level responsive means moving to normal position upon said replacement water entering said brine tank, said last named means on returning to normal position in response to high level response interrupting said closed secondary circuit.

3. Apparatus of the character described in claim 2 wherein said means for pivoting said pivotal mounting means for said first and second switches to closed position comprises a manually actuatable push button having means to strike and move said mounting means.

4. Apparatus of the character described in claim 2 wherein said means for pivoting said pivotal mounting means for said switches to closed position comprises secondary actuating means connected with said liquid level responsive means in said brine tank that is actuated on the level in said brine tank reaching a level above said high level.

5. In combination with a water softener having a softener tank, a brine tank, a hard water supply line, a service line, a first valve means in the supply line, a second valve means in the service line, a drain line, means connecting the supply line to the top of the softener tank, means connecting the bottom of the softener tank to the service line, means connecting a portion of the supply line with said drain line through said first valve means, means connecting a portion of the service line with the drain line through said second valve means, means connected with said second valve means and operable therewith for conducting brine from said brine tank to said softener tank and supplying replacement water to said brine tank, the improved control apparatus for completing electrical circuits to said first and second valve means comprising a movably mounted electrical power contact, a timer mechanism having settable means thereon for periodically moving said electrical power contact, cam means moved by said timer, a first and second movable contact connected respectively with said first and second valve means to provide a circuit thereto, said cam means first moving said first contact into conductive relation with said power contact at intervals when said power contact has not been moved by said settable means, said cam means subsequently when moved by said timer connecting said first contact with said second contact to complete a circuit to said second valve means.

6. A fluid distribution valve comprising a valve body having a top section, a middle section and a bottom section detachably connected, said valve body having a fluid supply passageway with an inlet portion in the bottom section, a supply passageway first valve seat in the bottom section between the inlet portion and middle portion of the supply passageway; a drain cavity in the middle section connected to said middle portion of the supply passageway and having therebetween a second valve seat; a drain cavity in the bottom section having a discharge opening to the outside of said lower section; a drain passageway in the middle section connecting said drain cavity in the middle section with the drain cavity in the bottom section; a fluid pressure actuator chamber in the middle section for a drain cut-off valve pressure actuator; a drain cut-off valve in the drain passageway of the middle section and provided with a fluid pressure actuator mounted in said fluid pressure actuator chamber therefor; a first valve element pressure actuator chamber in the middle section; a first valve element movably mounted in the middle section and having a pressure actuator in the pressure actuator chamber, a first valved means cooperating in down position to seat on said first valve seat in the supply passageway and close same off, and a second valved means cooperating in up position of the first valve element to seat on said second valve seat in the middle section to close of said drain cavity connection with said drain passageway in the middle section; a fluid pressure well in said middle section connected at one end with the inlet portion of the supply passageway; a first jet orifice and passageway in said middle section having a supply end terminating in the top of said middle section and a discharge terminating in said drain cavity in the lower section to place a suction thereon; a service passageway in said body having an inlet portion in the bottom section, a portion in the middle section and an outlet in the bottom section; a service passageway first valve seat in the bottom section between the inlet portion and the middle portion of the service passageway; a service drain cavity in the middle section connected to said middle portion of the service passageway and having there between a second valve seat; a second valve element pressure actuator chamber in the middle section; a second valve element movably mounted in the middle section and having a pressure actuator in the pressure actuator chamber therefor, a first valved means cooperating in down position to seat on said first valve seat in the service passageway and close same off and a second valved means cooperating in up position of the first valve element to seat on said last mentioned second valve seat in the middle section to close off said service drain cavity; a passage in the middle section connecting the service drain cavity with the bottom of said second valve element pressure actuator chamber below the pressure actuator therein; an interconnecting passageway between said pressure actuator chambers in the middle section below the pressure actuators therein; a drain passageway in the middle section connecting the bottom of the second valve element pressure actuator chamber with the drain cavity in the bottom section; a by-pass passageway in the middle section discharging at one end to the outlet end of said service passageway in the bottom section; a check valve in said by-pass passageway preventing flow from the service passageway outlet portion to said by-pass passageway and controlling the pressure and flow of the fluid passing through said by-pass passageway; a first control pressure passageway in the top section connecting said fluid pressure well and said jet orifice, said first valve element pressure actuator chamber above the pressure actuator therein and said by-pass passageway above the check valve therein; a control valve in said first control pressure passageway to control flow from said fluid pressure well; a second jet orifice and passageway in said middle section having an inlet for application of fluid pressure thereto, a suction passage adjacent the jet orifice discharge and a discharge passageway below the jet orifice; a check valve in the discharge passageway of said second jet orifice; a second control pressure passageway in the top section connecting said fluid pressure well and said second jet orifice, said second valve element pressure actuator chamber above the pressure actuator therein and said drain cut-off valve actuator chamber above the actuator therein; and a control valve in said second control pressure actuator passageway to control fluid pressure from said fluid pressure well.

7. A fluid distribution valve comprising a valve body having therein a fluid supply passageway with an inlet portion, a middle portion and an outlet; a supply passageway first valve seat between the inlet and middle portions of the supply passageway; a drain cavity connected to said middle portion of the supply passageway and having therebetween a second valve seat; a drain cavity in the bottom portion of said body and having a discharge to outside of said valve body, a drain passageway connecting said first mentioned drain cavity and said drain cavity in the bottom portion of the body; a fluid pressure actuator chamber for a drain cut-off valve pressure actuator; a drain cut-off valve in the drain passageway and provided with a fluid pressure actuator mounted in said fluid pressure actuator chamber therefor, a first valve element fluid pressure actuator chamber; a first valve element movably mounted in the body and having a pressure actuator in the fluid pressure actuator chamber therefor, a first valved means cooperating in down position to seat on said first valve seat in the supply passageway to close same off and a second valved means cooperating in up position of the first valve element to seat on said second valve seat to close off said drain cavity connected with said drain passageway; a fluid pressure well connected at one end with the inlet portion of the supply passageway; a first jet orifice and passageway having a supply end and a discharge end terminating in said drain cavity in the bottom portion of said body to place a suction thereon; a service passageway in said body having an inlet portion, and an outlet portion; a service passageway first valve seat between the inlet portion and the outlet portion of the service passageway; a service drain cavity connected to said outlet portion of the service passageway in adjacent spaced relationship to said first valve seat and having a second valve seat separating the drain cavity from the service passageway outlet portion; a second valve element pressure actuator chamber; a second valve element movably mounted in the body and having a pressure actuator in the pressure actuator chamber therefor, a first valved means cooperating in down position to seat on said first valve seat in the service passageway and close safe off and a second valved means cooperating in up position of the first valve element to seat on said last mentioned second valve seat to close off said service drain cavity; a passage connecting the service drain cavity with the bottom of said second valve element pressure actuator chamber below the pressure actuator therein; a drain passageway connecting the bottom of the second valve element pressure actuator chamber with the drain cavity in the bottom of the body; a by-pass passageway discharging at one end to the outlet end of said service passageway; a check valve in said by-pass passageway preventing flow from the service passageway outlet portions to said by-pass passageway and controlling the pressure and flow of the fluid passing through said by-pass passageway; a first control pressure passageway connecting said fluid pressure well and said jet orifice, said first valve element pressure actuator chamber above the pressure actuator therein and said by-pass passageway above the check valve therein; a control valve in said first control pressure passageway to control flow from said fluid pressure well; a second jet orifice and passageway having an inlet for application of fluid pressure thereto; a suction passage adjacent the jet orifice discharge and a discharge passageway below the jet orifice; a check valve in the discharge passageway of said second jet orifice; a second control pressure passageway in the top section connecting said fluid pressure well and said second jet orifice, said second valve element pressure actuator chamber above the pressure actuator therein and said drain cut-off valve actuator chamber above the actuator therein; and a control valve in said second control pressure actuator passageway to control fluid pressure from said fluid pressure well.

8. Automatic water softener apparatus comprising in combination; a softener tank having a mineral bed therein and a free board water space above said mineral bed, a hard water inlet above said free board space and a soft water outlet at the bottom of said tank; a brine tank having a common brine suction and water replacement conduit leading to adjacent the bottom thereof; a hard water supply passageway, a service passageway, means connecting the hard water passageway with the top of said softener tank, means connecting the service passageway with the bottom of said softener tank, liquid flow control and operating means utilizing two valve elements, each having two valve means thereon, one of said valve elements having its two valve means operating with the hard water passageway, the other of said valve elements having its two valve means operating with the service passageway, an injector jet for drawing brine from the brine tank and connecting means from the discharge of said jet to just above said mineral bed and below the free board in the softener tank, a drain passageway connected with the hard water supply passageway and having a cut-off means therein, said first valve element positioning in one position one of said valve means to connect the drain passageway with a portion of the hard water passageway to connect the softener tank to the drain passageway, a by-pass line means connecting a portion of the supply passageway with a portion of the service passageway, said second valve element positioning in one position one of said valve means thereon in the service passageway to furnish backwash water to the bottom of said softener tank whereupon a backwashing is accomplished; a drain passageway connected with the service passageway; hard water pressure supply means for moving said second valve element and positioning in another position the second valve means thereon to connect drain passage with the bottom of said softener tank and cause said first drain passageway cut-off means to close and said brine suction jet to draw brine from said brine tank followed by providing a slow rinse to said mineral bed below said free board; said first valve element returning to another position of service whereby water pressure is applied at the hard water inlet of the softener tank to cause a fast rate of rinse in the softener tank and brine making water is replenished in said brine tank bottom followed by said second valve element moving to service or first position.

9. Automatic water softener apparatus according to claim 22 including a height of liquid responsive means adjacent the bottom of said brine tank and wherein said first and second valve elements have pressure actuators therefor and said height of liquid responsive means for the brine tank has control means connected therewith and with the pressure actuator for second valve element to hold said pressure actuator open and actuating the second valve element until the replacement water reaches a predetermined height in said brine tank.

10. An automatic water softening apparatus comprising in combination a softener tank having a mineral bed therein, a hard water inlet and a soft water outlet; a brine tank having a common brine suction and water replacement conduit leading to said brine tank; a first valve element movably mounted to occupy a service position and a second position for backwashing, brining and slow rinse and having first and second valved means; means connecting the hard water inlet to a supply connection of water under pressure through the medium of said first valved means for the flow of water through the softener tank to a service line when said first valve element occupies its service position, said last named connecting means having a first portion between said valved means and the hard water inlet to said softener tank and a second portion between said valved means and said supply connection of water under pressure; a drain line; means connecting said first portion of the connecting means and said drain line through the medium of the second of said valved means when the first valve element occupies said second position to drain backwash from the softener tank, a cut-off valve means in said drain adjacent said second valved means; a second valve element movably mounted to occupy a first position of service and backwashing and a second position of brining and rinse and having two valved means; said service line having a first portion connected to the soft water outlet of said softener tank; said last mentioned valved means being connected in said first portion of the service line; one of said last mentioned valved means interrupting flow between the first portion of the service line and the balance of the service line when said second valve element is in second position; means connecting the first portion of said service line with said drain through the medium of the other of the valved means of the second valve element when in the said second position, said connection with the drain just mentioned being at a point downstream from said drain cut-off valve; a fluid pressure connecting means connecting said supply of water under pressure with said balance of said service line; said last named fluid pressure connecting means supplying water for backwashing to said service line and the soft water outlet of softener tank; said first and second valve elements having biasing means urging them into service positions; means for moving said first valve element to its said second position; water pressure actuating means for said second valve element to move it to second position; means connecting said water pressure actuating means with said supply of water under pressure; a control valve in said last mentioned connecting means for controlling the water pressure to said water pressure actuating means for the second valve element; an injector means connected with said water pressure supply means for said second valve element and having a suction line and a discharge line, said suction line being connected with said common brine suction and water replacement conduit of the brine tank and said discharge line being in communication with the softener tank above the mineral bed therein.

11. A water softener comprising, in combination, a softener tank having a mineral bed therein, a hard water inlet above the mineral bed and a soft water outlet at the bottom below the mineral bed, a brine tank having a common brine suction and water replacement conduit leading to adjacent the bottom thereof, a hard water supply passageway, a service passageway, means connecting the hard water passageway with the top of said softener tank, means connecting the service passageway with the bottom of said softener tank, liquid operating means including first and second valve elements, each valve element having first and second valve means thereon, a drain line connected with the hard water supply passageway, a second drain line connected with the service passageway, the first of said valve elements having its two valve means operating with the hard water supply passageway, said first valve element in its first position permitting hard water flow through the supply passageway and the second valve means thereon closing off flow to said drain line, said first valve element in its second position having its first valve means thereon closing off said supply passageway and its second valve means permitting flow from the top of softener tank to the drain line, said drain line having a cut-off means therein adjacent its connection with the supply passageway, the second valve element having its first and second valve means operating with the service passageway, a by-pass line means connecting a portion of the hard water supply passageway with a portion of the service passageway, means supplying hard water to the by-pass line when said first valve element is moved to second position, said second valve element in its first position positioning the first valve means thereon in the service passageway to furnish by-pass water to the bottom of and upward through the softener tank and the second valve means thereon closing off said second drain line in its connection to the service passageway, said second valve element in its second position having its first valve means thereon closing off said service passageway and its second valve means permitting flow from the bottom of the softener tank through a portion of said service passageway to the second drain line, an injector jet for drawing brine through the common brine suction and refill line and conduit means from the discharge of the jet to said softener tank for introduction of brine above the mineral bed and hard water pressure supply means for moving said second valve element to its second position and connected with said drain cut-off valve and actuating it to cut off flow between the hard water supply passageway and said first mentioned drain line and supplying water through said brine suction jet to draw brine from said brine tank and discharge it to said softener tank followed by providing a slow rinse to said mineral bed through said conduit means from discharge of jet to softener tank, said first valve element on returning to first position of service furnishing hard water supply pressure to the top of the softener tank causing a fast rate of rinse and repacking of the mineral bed and brine making water to flow through said jet to replenish the supply in said brine tank bottom, following which said second valve element is moved to service or first position on release of said hard water pressure supply acting thereon and soft water is furnished from the softener tank through said service passageway.

12. Automatic water softener apparatus comprising in combination; a softener tank having a mineral bed therein and a free board water space above said mineral bed, a hard water inlet above said free board space and a soft water outlet at the bottom of said tank; a brine tank having a common brine suction and water replacement conduit leading to adjacent the bottom thereof; a hard water supply passageway, a service passageway, means connecting the hard water passageway with the top of said softener tank, means connecting the service passageway with the bottom of said softener tank, liquid flow control and operating means utilizing two valve elements, each having two valve means thereon, one of said valve elements having its two valve means operating with the hard water passageway, the other of said valve elements having its two valve means operating with the service passageway, an injector jet for drawing brine from the brine tank and connecting means from the discharge of said jet to above said mineral bed in the softener tank, a drain passageway connected with the hard water supply passageway and having a cut-off means therein, said first valve element positioning in one position one of said valve means to connect the drain passageway with a portion of the hard water passageway to connect the softener tank to the drain passageway, a by-pass line means connecting a portion of the supply passageway with a portion of the service passageway, said second valve element positioning in one position one of said valve means thereon in the service passageway to furnish backwash water to the bottom of said softener tank whereupon a backwashing is accomplished; a drain passageway connected with the service passageway; hard water pressure supply means for moving said second valve element and the second valve means thereon to connect said last mentioned drain passageway with the bottom of said softener tank and cause said first drain cut-off means to close and said brine suction jet to draw brine from said brine tank followed by providing a rinse to said mineral bed; said first valve element returning to another position of service whereby water pressure is applied at the hard water inlet of the softener tank and brine making water is replenished in said brine tank bottom followed by said second valve element moving to service or first position.

References Cited in the file of this patent
UNITED STATES PATENTS

| | | |
|---|---|---|
| 1,611,422 | Duden | Dec. 21, 1926 |
| 1,652,710 | Dotterweich | Dec. 13, 1927 |
| 1,910,753 | Colvin | May 23, 1933 |
| 2,209,993 | McGill | Aug. 6, 1940 |
| 2,243,815 | Griswold | May 27, 1941 |
| 2,265,225 | Clark | Dec. 9, 1941 |
| 2,309,032 | Zimmerman | Jan. 19, 1943 |
| 2,704,554 | Russell et al. | Mar. 22, 1955 |
| 2,744,867 | Webb | May 8, 1956 |

UNITED STATES PATENT OFFICE

CERTIFICATE OF CORRECTION

Patent No. 3,044,626

July 17, 1962

Donald Rose

It is hereby certified that error appears in the above numbered patent requiring correction and that the said Letters Patent should read as corrected below.

Column 20, line 51, for "of" read -- off --; column 22, line 1, for "safe" read -- same --.

Signed and sealed this 30th day of October 1962.

(SEAL)
Attest:

ERNEST W. SWIDER
Attesting Officer

DAVID L. LADD
Commissioner of Patents